US011662928B1

(12) United States Patent
Kumar et al.

(10) Patent No.: US 11,662,928 B1
(45) Date of Patent: May 30, 2023

(54) SNAPSHOT MANAGEMENT ACROSS CLOUD PROVIDER NETWORK EXTENSION SECURITY BOUNDARIES

(71) Applicant: Amazon Technologies, Inc., Seattle, WA (US)

(72) Inventors: Sandeep Kumar, Sammamish, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 16/698,314

(22) Filed: Nov. 27, 2019

(51) Int. Cl.
*G06F 3/06* (2006.01)
*G06F 11/14* (2006.01)
*G06F 8/658* (2018.01)
*H04L 9/08* (2006.01)
*G06F 21/62* (2013.01)
*H04L 9/40* (2022.01)

(52) U.S. Cl.
CPC ............ *G06F 3/064* (2013.01); *G06F 3/067* (2013.01); *G06F 3/0622* (2013.01); *G06F 3/0656* (2013.01); *G06F 8/658* (2018.02); *G06F 11/1458* (2013.01); *G06F 21/6218* (2013.01); *G06F 21/6236* (2013.01); *H04L 9/0819* (2013.01); *H04L 63/0464* (2013.01)

(58) Field of Classification Search
CPC ..... G06F 21/62–629; G06F 3/06–0689; G06F 8/658; G06F 11/1458; H04L 9/0819; H04L 63/0464
See application file for complete search history.

(56) References Cited

U.S. PATENT DOCUMENTS

| 8,789,208 | B1* | 7/2014 | Sundaram | ............. | G06F 3/0604 |
| | | | | | 726/28 |
| 9,275,249 | B1 | 3/2016 | Allen | | |
| 9,455,963 | B1* | 9/2016 | Roth | ................... | H04L 63/0464 |
| 9,584,517 | B1* | 2/2017 | Roth | ..................... | G06F 21/602 |
| 9,864,874 | B1* | 1/2018 | Shanbhag | ............... | H04L 63/10 |
| 11,086,545 | B1* | 8/2021 | Dayal | ..................... | G06F 3/067 |

(Continued)

OTHER PUBLICATIONS

Rahumed, "A secure Cloud Backup System with Assured Deletion and Version Control", 2011, International Conference on Parallel Processing Workshops, pp. 1-8, 2011.

*Primary Examiner* — Madhuri R Herzog
(74) *Attorney, Agent, or Firm* — Knobbe, Martens, Olson & Bear, LLP

(57) ABSTRACT

Systems and methods for efficient and secure management of encrypted "snapshots" for a remote provider substrate extension ("PSE") of a cloud provider network substrate are provided. The PSE may request and obtain a snapshot from the cloud provider network substrate, restore a volume from the snapshot, make changes to data in the restored volume, and/or initiate the creation and storage of a new snapshot that includes incremental updates to the original snapshot to reflect the changes made to data in the volume. An encrypted snapshot stored within the cloud provider network substrate may be decrypted using a cloud provider key designed for internal use only, and then re-encrypted using a PSE-specific key before providing the snapshot to the PSE, thereby avoiding the sharing of the cloud provider internal use only key outside the cloud provider network substrate.

22 Claims, 8 Drawing Sheets

(56) References Cited

U.S. PATENT DOCUMENTS

| | | |
|---|---|---|
| 2011/0138472 A1 | 6/2011 | Nikitin et al. |
| 2015/0052111 A1 | 2/2015 | Mason, Jr. et al. |
| 2016/0048408 A1 | 2/2016 | Madhu et al. |
| 2016/0154817 A1 | 6/2016 | Mason, Jr. et al. |
| 2016/0292193 A1* | 10/2016 | Madanapalli ....... G06F 21/6218 |
| 2016/0342334 A1 | 11/2016 | Elisha |
| 2018/0198613 A1 | 7/2018 | Anderson et al. |
| 2019/0207764 A1 | 7/2019 | Maximov et al. |
| 2020/0007611 A1* | 1/2020 | Levinson ............ H04L 67/1097 |
| 2020/0183587 A1 | 6/2020 | Mak et al. |
| 2020/0192576 A1 | 6/2020 | Nair et al. |

* cited by examiner

SNAPSHOT MANAGEMENT ACROSS CLOUD PROVIDER NETWORK EXTENSION SECURITY BOUNDARIES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Figure 1:
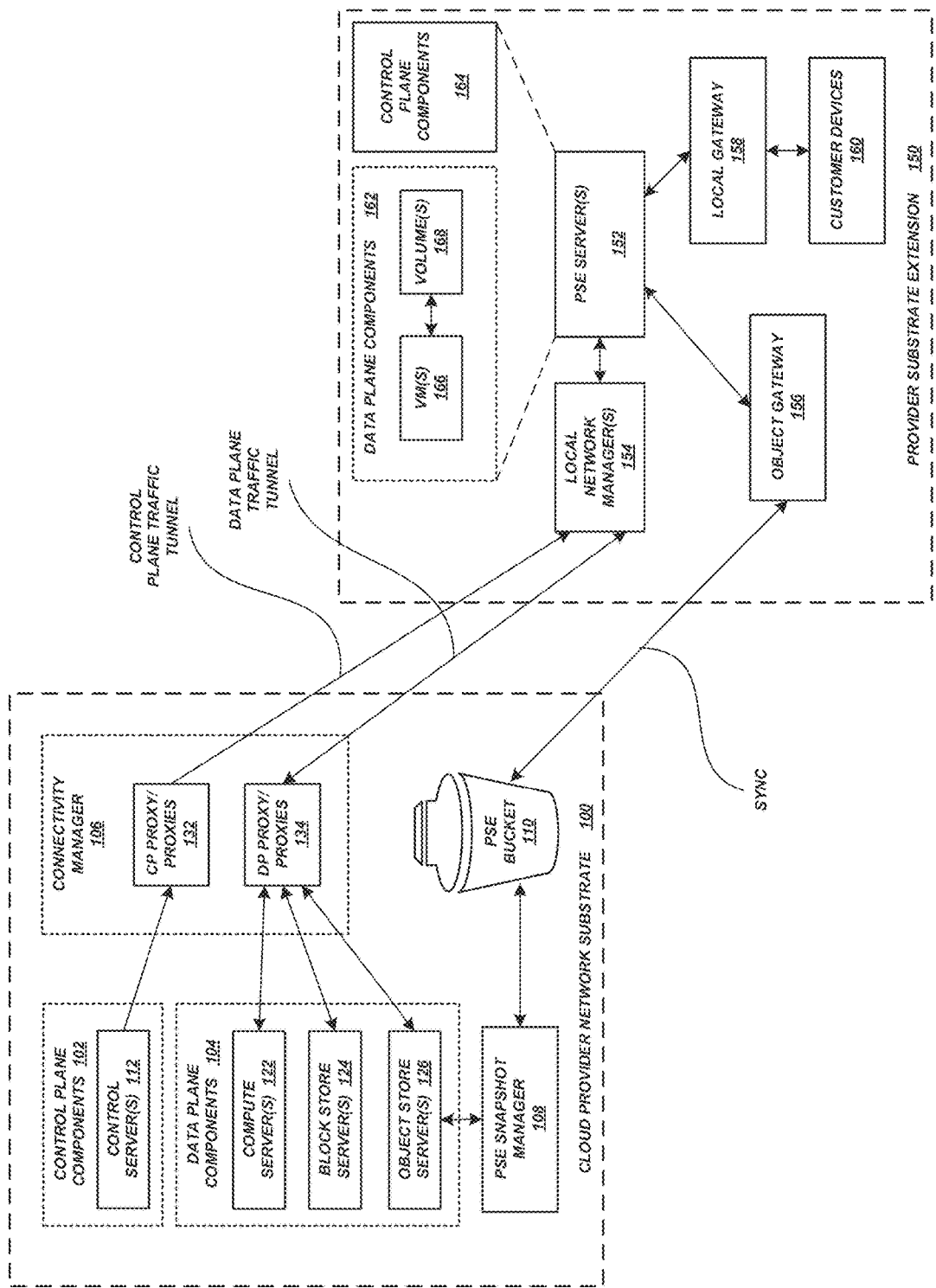
FIG. 1 is a block diagram of an example cloud provider network extended by a provider substrate extension located within a network external to the cloud provider network according to some embodiments.

Generally described, the present disclosure relates to the efficient and secure management of encrypted "snapshots" (e.g., computing objects that each represent values of every block of a block storage volume or device at a specific point in time) for a remote extension of a cloud provider network substrate. The remote extension may be referred to as a provider substrate extension ("PSE"). The PSE is physically external to and separate from the cloud provider network substrate. The PSE may request and obtain a snapshot from the cloud provider network substrate, restore a volume from the snapshot, make changes to data in the restored volume, and initiate the creation and storage of a new snapshot that includes incremental updates to the original snapshot to reflect the changes made to data in the volume. The new incremental snapshot is created and stored in the cloud provider network substrate using the same or similar application programming interference ("API") calls as would be used by computing systems that are part of the cloud provider network substrate. The retrieval, use, generation, updating, and storage of encrypted snapshots is thereby seamless to users of the PSE. In addition, an encrypted snapshot stored within the cloud provider network substrate may be decrypted using a cloud provider key designed for internal use only, and then re-encrypted using a PSE-specific key before providing the snapshot to the PSE, thereby avoiding the sharing of the cloud provider internal use only key outside the cloud provider network substrate.

Conventionally, cloud providers have a wide variety of computing resources that are available to customers, including resources for compute services, storage services, messaging services, and the like. For some types of applications, such as applications that process a very large amount of data that has to be stored at the customer premises outside the cloud provider network substrate (e.g., for legal compliance, security, minimizing latency in communication with customer devices, etc.), using services that are provided exclusively by hardware located at data centers of the cloud provider may not be optimal. To address these issues, a cloud provider may provide an extension of the cloud provider network substrate—a PSE—to be provisioned within the customer's network. A customer may access their PSE via the cloud provider network substrate or their own network, and may use the same APIs to create and manage resources in the PSE as they would use to create and manage resources in the cloud provider network substrate. However, the use of a PSE may cause issues for customers who wish to restore volumes within the PSE from volume snapshots, instantiate virtual machines within the PSE from machine image snapshots, or generate snapshots of volumes or virtual machines in use at the PSE. For example, the PSE, which typically includes a small fraction of the computing resources of the cloud provider, may not have an amount of storage sufficient to manage desired snapshots. As another example, if snapshots are stored at the cloud provider network substrate in encrypted form for security purposes and retrieved for use by the PSE, the decryption key will need to be shared with the PSE, thereby potentially introducing security risks.

Some aspects of the present disclosure address the issues described above, among others, by maintaining snapshots for the PSE at the cloud provider network substrate. The cloud provider network substrate may have significantly more storage resources available to store snapshots (e.g., an exponential amount more than the PSE, and the amount may be able to be continually increased without any change to the PSE). To reduce the amount of storage resources used at the PSE for storage of snapshots, the PSE can access snapshots stored at the cloud network provider. The snapshots accessed at the cloud network provider can be used to restore volumes at the PSE, instantiate virtual machines at the PSE, and the like, without requiring the snapshots to be physically maintained in storage at the PSE. Thus, the storage capabilities of the PSE may remain low while still leveraging a significant amount of snapshot storage at the cloud network provider.

Additional aspects of the present disclosure relate to minimizing the bandwidth required to generate an updated snapshot reflecting changes made at the PSE and then store the updated snapshot at the cloud provider network substrate. The PSE may determine which portions of a volume (e.g., which storage blocks) have changed from the time the volume was restored from a basis snapshot. Instead of sending the entire volume to the cloud provider network for storage of a snapshot, the PSE may send only the blocks that have changed. The cloud provider network can manage the creation of incremental snapshots using the blocks that have changed, and the original snapshot from which the volume being backed up was previously restored.

Further aspects of the present disclosure relate to enforcing an encryption key boundary between the cloud provider network substrate and the PSE. Snapshots maintained at the cloud provider network substrate may be stored in encrypted form. The particular key that is used to encrypt a given snapshot may not be shared outside of the cloud provider for security reasons if the key is a symmetric key (e.g., the same key is used to encrypt and decrypt data), or the decryption key that corresponds to the encryption key used to encrypt a given snapshot may not be shared outside of the cloud provider for security reasons if asymmetric keys are used (e.g., one key is used to encrypt the data, and another key is used to decrypt the data). For example, by sharing a key outside of the cloud provider network substrate, the cloud provider may lose control over who or what has access to the key. Preventing the key from being shared outside of the cloud provider can help to maintain the security of the encrypted snapshots and other data maintained within the cloud provider. However, preventing the key from being shared outside of the cloud provider can prevent a PSE from accessing encrypted snapshots. In order to allow PSEs to access the data within encrypted snapshots, the cloud provider may, prior to sending snapshots to ta PSE, decrypt the snapshots and then re-encrypt them using a key that is specific to the PSE and known to or able to be shared with the PSE. In this way, the only data maintained within the cloud provider that would be compromised by sharing the key outside of the cloud provider would be data (e.g., snapshots) encrypted using that specific key.

Various aspects of the disclosure will now be described with regard to certain examples and embodiments, which are intended to illustrate but not limit the disclosure. Although aspects of some embodiments described in the disclosure will focus, for the purpose of illustration, on particular examples of storage data structures, API calls, and encryption protocols, the examples are illustrative only and are not intended to be limiting. In some embodiments, the techniques described herein may be applied to additional or alternative storage data structures, API calls, encryption protocols, and the like.

Overview of Example Computing Environment with Snapshot Management

With reference to an illustrative embodiment, FIG. 1 shows an example computing environment in which the snapshot management features of the present disclosure may be implemented. As shown, the computing environment includes a cloud provider network substrate 100 (also referred to herein as a "cloud provider network," "provider network," "cloud provider system", or simply as a "cloud" for convenience) and a provider substrate extension 150 (also referred to herein as a "provider network extension" or simply as a "PSE" for convenience) that is a remote extension of the cloud provider network 100. The cloud provider network 100 and the PSE 150 may communicate with each over via an intermediate network (not shown), such as the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

The control plane components 102 are typically implemented on a separate set of servers from the data plane components 104, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

In some embodiments, a snapshot is a point-in-time block-level backup of a volume, stored as a copy of data on the volume on one or more of the object storage servers 126 (e.g., as a single object or a collection of objects). However, unlike other data stored on the object storage servers 126, snapshots may not be directly accessible within object storage buckets, and instead are accessible through the API of the block store servers 124. In one example, snapshots are implemented as incremental records of data within a volume. Illustratively, when the first snapshot of a volume is taken, all blocks of the volume that contain valid data are copied as one or more objects to the object storage servers 126, and then a snapshot definition or "manifest" file is written to the object storage servers 126 that includes a record of the one or more objects, as well as the blocks of the volume to which each of the one or more objects correspond. Due to the use of incremental snapshots, when the subsequent snapshots are taken of the same volume, only the blocks that have changed since the first snapshot need to be copied to the object storage servers 126, and the manifest can be updated to point to the latest versions of each data block (or a second manifest can be created, enabling the initial manifest to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 126, and new copies of the instance can be launched from the machine image.

Users can instruct the cloud provider network 100 to create snapshots of their volumes on the block store servers 124 and store the snapshots on the object store servers 126. A snapshot can then be used to create a new volume with information matching the volume captured in the snapshot, for example providing the benefit of feeding the volume data to the new copy without impacting I/O operations at other replicas of the volume. Further, due to the greater redundancy of the object store servers 126 provided in some embodiments, such snapshots may provide a more resilient backup copy of a volume than additional copies stored on the block store servers 124. Another benefit of using a snapshot to create a new volume copy is that it may provide the ability to replicate the volume across availability zones, while the block store servers 124 may only support replication within a given availability zone.

The connectivity manager 106 (including control plane proxies 132 and data plane proxies 134), PSE snapshot manager 108, and PSE bucket 110 depicted in the cloud provider network 100 may be provisioned in a particular region or availability zone of the cloud provider network 100 in response to the creation of a substrate extension 150, and are described in further detail below.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as a "provider substrate extension" or PSE 150—to be provisioned within the customer's network. A customer may access their PSE 150 via the cloud provider network 100 or their own network, and may use the same APIs to create and manage resources in the PSE 150 as they would use to create and manage resources in the cloud provider network 100 region.

The PSE 150 may be pre-configured, e.g. by the provider network operator, with the appropriate combination of hardware with software and/or firmware elements to support various types of computing-related resources, and to do so in a manner that mirrors the experience of using the cloud provider network 100. For example, one or more PSE servers 152 can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE 150 as they do in the cloud provider network 100 region, the PSE server 152 can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server 152, meaning while other VMs are still running and consuming other capacity of the PSE server 152. This can improve utilization of resources within the PSE 150 by allowing for better packing of running instances on physical hosts, and also provides a seamless experience regarding instance usage across the cloud provider network 100 region and PSE 150.

As illustrated, the PSE servers 152 can host one or more VMs 166. The customer can use these VMs 166 to host containers, which package up code and all its dependencies so an application can run quickly and reliably from one computing environment to another. In addition, the PSE servers 152 may host one or more data volumes 168, if desired by the customer. In the cloud provider network 100 region, such volumes may be hosted on dedicated block store servers 124. However, due to the possibility of having a significantly smaller capacity in the PSE 150 than in the region, it may not provide an optimal utilization experience if the PSE 150 includes such dedicated block store servers. Accordingly, the block storage service may be virtualized in the PSE 150, such that one of the VMs runs the block store software and stores the data of the volume. Similar to the operation of the block storage service in the region, the volumes within a PSE 150 may be replicated for durability and availability. The volumes may be provisioned within their own VPC within the PSE 150. The VMs 166 and any volumes 168 collectively make up the data plane components 162 within the PSE 150 that are an extension of the provider network data plane 162.

The PSE servers 152 may, in some implementations, host certain local control plane components 164, for example components that enable the PSE 150 to continue functioning if there is a break in the connection back to the cloud provider network 100 region. Examples of these components include a migration manager that can move VMs between PSE servers if needed to maintain availability, a key value data store that indicates where volume replicas are located, and a local VM placement component that can respond to requests for new VMs made via the customer network. However, generally the control plane for the PSE 150 will remain in the cloud provider network 100 region, in order to allow the customer to use as much capacity of the PSE 150 as possible. At least some VMs 166 that are set up at the PSE 150, and associated higher-level services that use such VMs 166 as building blocks, may continue to function even during periods of time when connectivity to the provider network data centers is temporarily disrupted in some embodiments.

Server software may be designed by the cloud provider to run on the cloud provider network 100, and this software may be enabled to run unmodified in a PSE 150 by using the local network manager(s) 154 to create a private replica of the cloud provider network 100 within the PSE 150 (the "shadow substrate"). The local network manager(s) 154 can run on PSE 152 servers and bridge the shadow substrate with the customer's on-premise network, for example by acting as a VPN endpoint between the PSE 150 and the proxies 132, 134 provisioned in the cloud provider network 100, and by implementing the mapping service (for traffic encapsulation and decapsulation) to relate data plane traffic (from the DP proxies 134) and control plane traffic (from the CP proxies 132) to the appropriate droplet. By implementing a local version of the provider network's substrate-overlay mapping service, resources in the PSE 150 can seamlessly communicate with resources in the cloud provider network 100 region. In multi-rack PSEs 150, inter-rack communications can go through the local network managers 154, with local network managers 154 maintaining open tunnels to one another. The local network managers 154 may be collocated on the PSE servers 152, may run on a separate card of the PSE server 152 (e.g., an offload card), or can be installed as their own servers separate from the compute hosts. In some implementations, a single local network manager 154 can perform these actions for all hosts in the PSE 150. In other implementations, each host in the PSE 150 may have a dedicated local network manager 154.

PSEs 150 can require secure networking tunnels from the customer network to the cloud provider network 100 in order to operate, for example to maintain security of customer data when traversing an intermediate network, which may be the Internet. These tunnels are composed of virtual infrastructure components including VPCs, CP proxies 132 and DP proxies 134 (which may be implemented as containers running on compute instances), and substrate network interfaces. Every host in a PSE 150 can require at least two tunnels, one for CoAP control plane traffic and one for encapsulated data plane traffic. The connectivity manager 106 manages the cloud provider network 100 region-side lifecycle of these tunnels and their components, for example provisioning them automatically when needed and maintaining them in a healthy operating state.

A control plane (CP) proxy 132 can be provisioned in the cloud provider network 100 to represent particular host(s) in the PSE 150. A CP proxy 132 is an intermediary between the substrate in the cloud provider datacenter and the shadow substrate in the PSE 150. The CP proxy 132 maintains a VPN tunnel to a local network manager 154 in the PSE 150. CP proxies 132 can be implemented as compute instances that have a network interface in the substrate and an additional network interface in a VPC. CP proxies 132 can implement VPN tunnels back to the cloud provider network 100 region, instance traffic NATing to/from customer networks, and participate in the CoAP proxy path. CP proxies 132 provide infrastructure for tunneling management API traffic destined for PSE hosts out of the region substrate and to the remote PSE location. The software implemented within the CP proxies 132 ensures that only well-formed API traffic leaves from and returns to the substrate. CP proxies 132 provide a mechanism to expose remote devices (within a PSE 150 in a customer facility) on the cloud provider substrate, while still protecting substrate security materials (e.g., GIS keys, GTS tokens) from leaving cloud provider datacenters. The one way control plane traffic tunnel imposed by the CP proxies also importantly prevents any (potentially compromised) devices from making calls back to the substrate. CP proxies 132 may be instantiated one-for-one with PSE servers 152, or may be able to manage control plane traffic for multiple PSE servers 152 in the same PSE 150.

A data plane (DP) proxy 134 can also be provisioned in the cloud provider network 100 to represent particular host(s) in the PSE 150. The DP proxy 134 acts as a shadow or anchor of the host, and can be used by services within the cloud provider network 100 to monitor health of the host (including its availability, used/free compute and capacity, used/free storage and capacity, and network bandwidth usage/availability). The DP proxy 134 also allows VPCs to span PSEs and a public region of the cloud provider network 100, by acting as a proxy for the PSE server 152 in the cloud provider network 100 region. Each DP proxy 134 can be implemented as a packet-forwarding compute instance or container. As illustrated, each DP proxy 134 can maintain a VPN tunnel with the local network manager 154 that manages the PSE server 152 that the DP proxy 134 represents. This tunnel can be used to send data plane traffic between the PSE 150 and the cloud provider network 100 region. Data plane traffic flowing between the PSE 150 and the cloud provider substrate can be passed through DP proxies 134 associated with that PSE 150. For data plane traffic flowing from the PSE 150 to the cloud provider substrate, DP proxies 134 can receive encapsulated data plane traffic, validate it for correctness, and allow it to enter into the substrate network. DP proxies 134 can forward encapsulated traffic from the cloud provider substrate directly to the PSE 150. If a DP proxy 134 receives any control plane traffic from the PSE 150, it will drop the traffic so that it does not enter the substrate. Regarding control plane traffic flowing from the region to the PSE 150, DP proxies 134 can delegate non-encapsulated traffic (e.g., control plane traffic) to the appropriate CP proxy 132 based on substrate IP address. Beneficially, this enforces the one-way secure tunnel between the CP proxies 132 and the local network manager 154 for control plane traffic, protecting the cloud provider network 100 against any potentially malicious control traffic flowing in from a PSE 150, but still allowing the customer to send control signals into the PSE 150 via the cloud provider substrate (e.g., to provision VMs 166 in the PSE 150, create volumes 168 in the PSE 150, attach these VMs 166 to these volumes 168, to deprovision any resources in the PSE 150, and to configure networking for PSE resources).

In at least some embodiments, a local network manager 154 may initiate the automated establishment of (or at least participate in the automated establishment of) secure network connectivity with the proxies 132, 134 established at one or more provider network data centers. After connectivity has been established between the local network manager 154 and the proxies 132, 134 at the provider network data center(s), the customer may issue commands to instantiate virtual machines (and/or perform other operations using virtual machines) that use PSE resources, in a manner analogous to the way in which such commands would be issued with respect to virtual machines that use only provider network resources. From the perspective of the customer, the functionality of the cloud provider network 100 may now seamlessly be utilized using local resources within the PSE 150 (as well as resources located in the provider network data centers, if desired). The VMs 166 set up on a PSE server 152 at the provider substrate extension 150 may communicate (e.g., with the help of the network manager 154, which may perform address translation and/or other encapsulation protocol-related processing) both with customer devices 160 located on the customer's computing network in various embodiments, as well as with other VMs that are set up in the provider network data centers, as desired.

A local gateway 158 can be implemented to provide network connectivity between resources running on the PSE servers 152 and customer devices 160 on the customer's network, in order to take advantage of the reduced latency and other benefits of having cloud provider hardware installed in the customer network. The customer can configure the local gateway 158 by issuing API calls to an interface of the cloud provider network 100 which results in control plane commands being sent to the PSE 150. The customer can establish communications between instances hosted by the PSE 150 and the customer devices 160 via the local gateway 158. The local customer devices 160 can include any on-premise or mobile devices that have access to the customer network, for example robotic devices, manufacturing devices, medical equipment, mobile phones, or other computing devices on the customer network.

There may be circumstances that necessitate the transfer of data between the object storage service in the cloud provider network 100 and the PSE 150. For example, the object storage service may store machine images used to launch VMs 166, as well as snapshots representing point-in-time backups of volumes 168. The object gateway 156 can be a provider on a PSE server 152 or a specialized storage device, and provides customers with configurable, per-bucket caching of object storage bucket contents in their PSE 150 to minimize the impact of PSE-region latency on the customer's workloads. The object gateway 156 can also temporarily store snapshot data from snapshots of volumes in the PSE 150 and then sync with the object store servers 126 in the region when possible. The object gateway 156 can also store machine images that the customer designates for use within the PSE 150 or on the customer's premises.

In the manner described above, the PSE 150 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In some implementations, the data within the PSE 150 may be encrypted with a unique key, and the cloud provider network 100 can limit keys from being shared from the region to the PSE 150 for security reasons. Accordingly, data exchanged between the object store servers 126 and the PSE 150 (e.g., via the object gateway 156 and/or a virtualized block storage service on a PSE server 152 without necessarily using an object gateway 156) may require encryption, decryption, and/or re-encryption in order to preserve security boundaries with respect to encryption keys. The PSE snapshot manager 108 can perform these operations, and a PSE bucket 110 can be created (on the object store servers) to store snapshot and machine image data using the PSE encryption key. In some embodiments, there may be a separate PSE bucket 110 for each separate PSE 150.

Some of the examples that follow generally relate to the use of symmetric keys in which the same key may be used to encrypt and decrypt data, and the key may not be permitted to be accessed across specific security boundaries and/or in specific scenarios. However, the examples are illustrative only and are not intended to be limiting. In some embodiments, different encryption systems may be used. For example, asymmetric cryptography may be used in which different keys are used to encrypt and decrypt data. One key may be an encryption key used to encrypt snapshots, while a different key—the corresponding decryption key—is used to decrypt the encrypted snapshots. In these examples, it is the decryption key, or both the encryption and decryption key, that may not be permitted to be accessed across specific security boundaries and/or in specific scenarios.

Example Process for Restoring a Snapshot to a PSE

Figure 2:
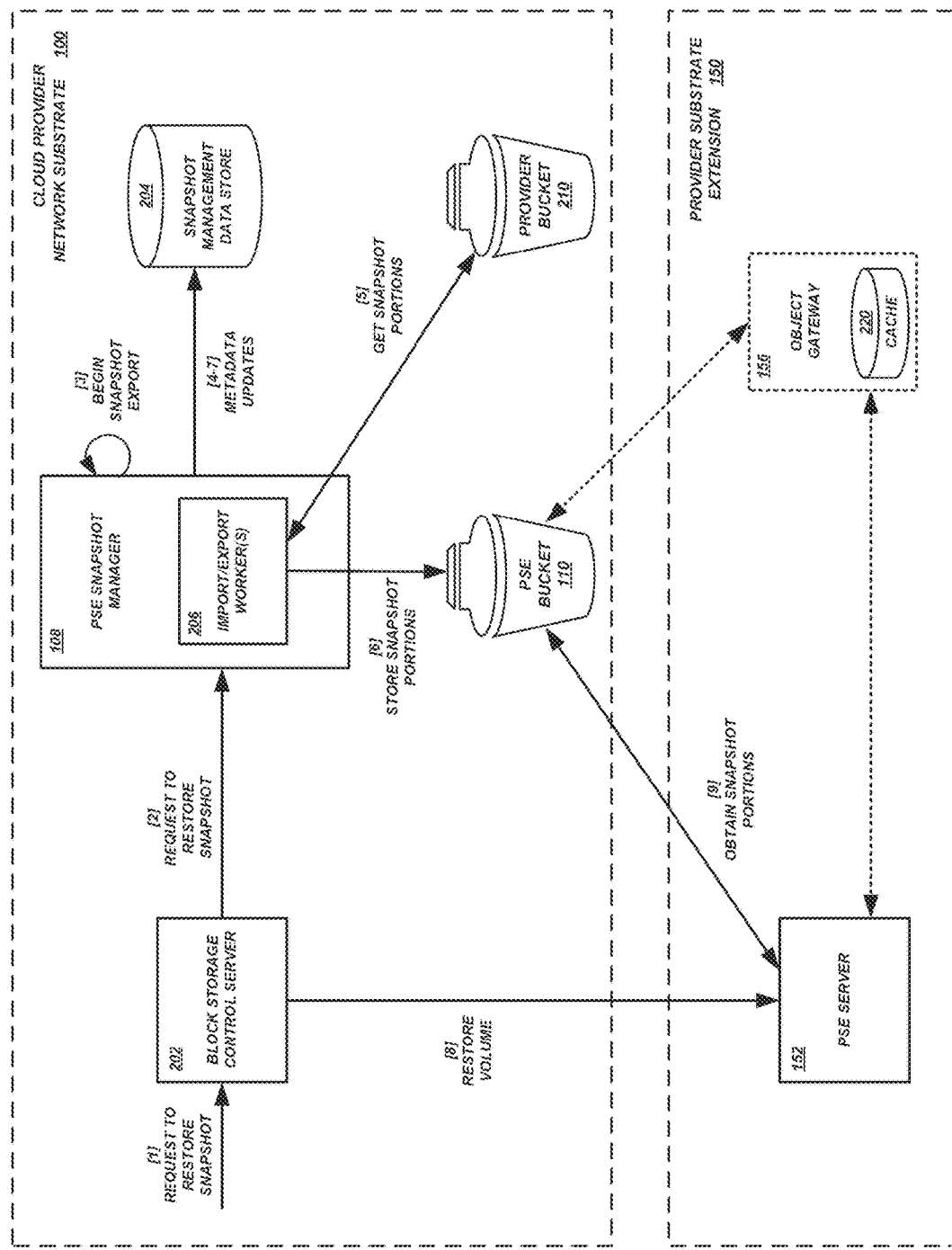
FIG. 2 is a block diagram of illustrative data flows and interactions between components of the cloud provider network and the provider substrate extension during snapshot export to the provider substrate extension according to some embodiments.

FIG. 2 is a block diagram of illustrative data flows and interactions between components of the cloud provider network 100 and PSE 150 during the process of restoring a snapshot to the PSE 150 from the object storage service at the cloud provider network 100. Some of the data flows and interactions illustrated in FIG. 2 will be described with further reference to FIG. 3, which is a flow diagram of operations that may be performed or managed by the PSE snapshot manager 108 to prepare a copy of a requested snapshot for export to the PSE 150.

Although FIG. 2 omits several of the components shown in FIG. 1, in some embodiments the cloud provider network 100 and PSE 150 may include any or all of the components shown in FIG. 1, additional components, or alternative components. For example, although many of the communications between the cloud provider network 100 and the PSE 150 may go through the connectivity manager 106 and/or local network manager 154, these components have been omitted from FIG. 2 for simplicity.

The cloud provider network 100 illustrated in FIG. 2 includes a block storage control server 202 to manage the provider-side control plane communications to initiate the restoration of a volume or VM from a snapshot, a snapshot management data store 204 to store information about the process of generating an export version of a requested snapshot for export to the PSE 150, and a provider bucket 210 to store one or more snapshots within the cloud provider network 100. These components may be implemented on the control plane components 102 and data plane components 104 of the cloud provider network 100. In addition, the cloud provider network 100 includes a PSE snapshot manager 108 and a PSE bucket 110. The PSE snapshot manager 108 includes one or more import/export workers 206 to implement functionality for exporting a snapshot from the provider bucket 210 to the PSE bucket 110 and performing decryption and re-encryption of the snapshot if needed.

The PSE 152 server illustrated in FIG. 2 may include various components for implementing the functionality described below. In some embodiments, a PSE server 152 may implement a virtualized block store server for restoring volumes 168 from snapshots exported from the cloud provider network 100. The volumes 168 may be restored on the same physical PSE server 152 as the virtualized block store server, or restored on a different physical PSE server 152.

As illustrated in FIG. 2 at [1], the block storage control server 202 may receive a request, or otherwise determine that a request has been made, for a volume or VM to be created in the PSE 150 from a snapshot stored at the cloud provider network 100. The request may include identifiers and/or various other parameters for completing the request. For example, the request may include an identifier of the snapshot to be restored, an identifier of the requestor, and an identifier of the PSE server 152 to which the snapshot is to be restored.

At [2], the block storage control server 202 may send a request to the PSE snapshot manager 108 to prepare the snapshot to be exported to the PSE 150.

At [3], the PSE snapshot manager 108 may begin the process of preparing the snapshot to be exported to the PSE 150. Rather than provide the PSE 150 with access to the provider bucket 210 or otherwise initiate a transfer of the requested snapshot directly from the provider bucket 210 to the PSE 150, the PSE snapshot manager 108 may first generate a copy of the requested snapshot and store the copy in the PSE bucket 110. In some embodiments, the PSE bucket 110 may be a bucket specifically designated for the PSE 150 to which the snapshot is to be sent.

The PSE snapshot manager 108 may generate metadata at the beginning of—and throughout—the snapshot export process. For example, as shown FIG. 2 at [4], the PSE snapshot manager 108 may generate metadata in the snapshot management data store 204 indicating the beginning of the snapshot export process. The PSE snapshot manager 108 may then proceed with generating the copy of the requested snapshot.

The copy of requested snapshot, which may be referred to as the export version or export copy, may be generated and stored in the PSE bucket 110 for a number of reasons. For example, by creating an export version and storing it in a separate bucket for export, the cloud provider network 100 can avoid exposing the provider bucket 210 directly to an external network like the PSE 150. In addition, the PSE snapshot manager 108 can apply alternative encryption to the export version than had been provided to the original snapshot stored in the provider bucket 210. Application of alternative encryption may include decrypting a copy of the original requested snapshot (or individual portions thereof) using a provider-side-only key, and then re-encrypting the copy of the original snapshot using a key specific to the destination PSE 150 to generate the export version. Thus, the provider-side-only key does not need to be shared outside of the cloud provider network 100, while the export version of the snapshot that is shared outside of the cloud provider network 100 to the PSE 150 is still encrypted.

The process of generating an export version of the requested snapshot and applying alternative encryption when doing so may introduce latency in comparison with simply providing the requested snapshot directly from the provider bucket 210. To minimize or avoid the latency altogether, individual portions of the requested snapshot may be copied and re-encrypted in parallel or otherwise asynchronously. The PSE snapshot manager 108 may have multiple import/export workers 206 that can each obtain different portions of the requested snapshot from the provider bucket at [5], decrypt and re-encrypt the individual portions as needed, and store the re-encrypted portions in the PSE bucket 110 at [6]. For example, the snapshot may be stored as a set of chunks, where each chunk is a predetermined or dynamically determined size. Metadata associated with the snapshot, such as a manifest, can identify the chunks in the provider bucket 210 that make up the requested snapshot. The PSE snapshot manager 108 can assign individual chunks or sets of chunks to individual import/export workers 206, and the import/export workers 206 may perform their copy and re-encryption tasks in parallel.

Figure 3:
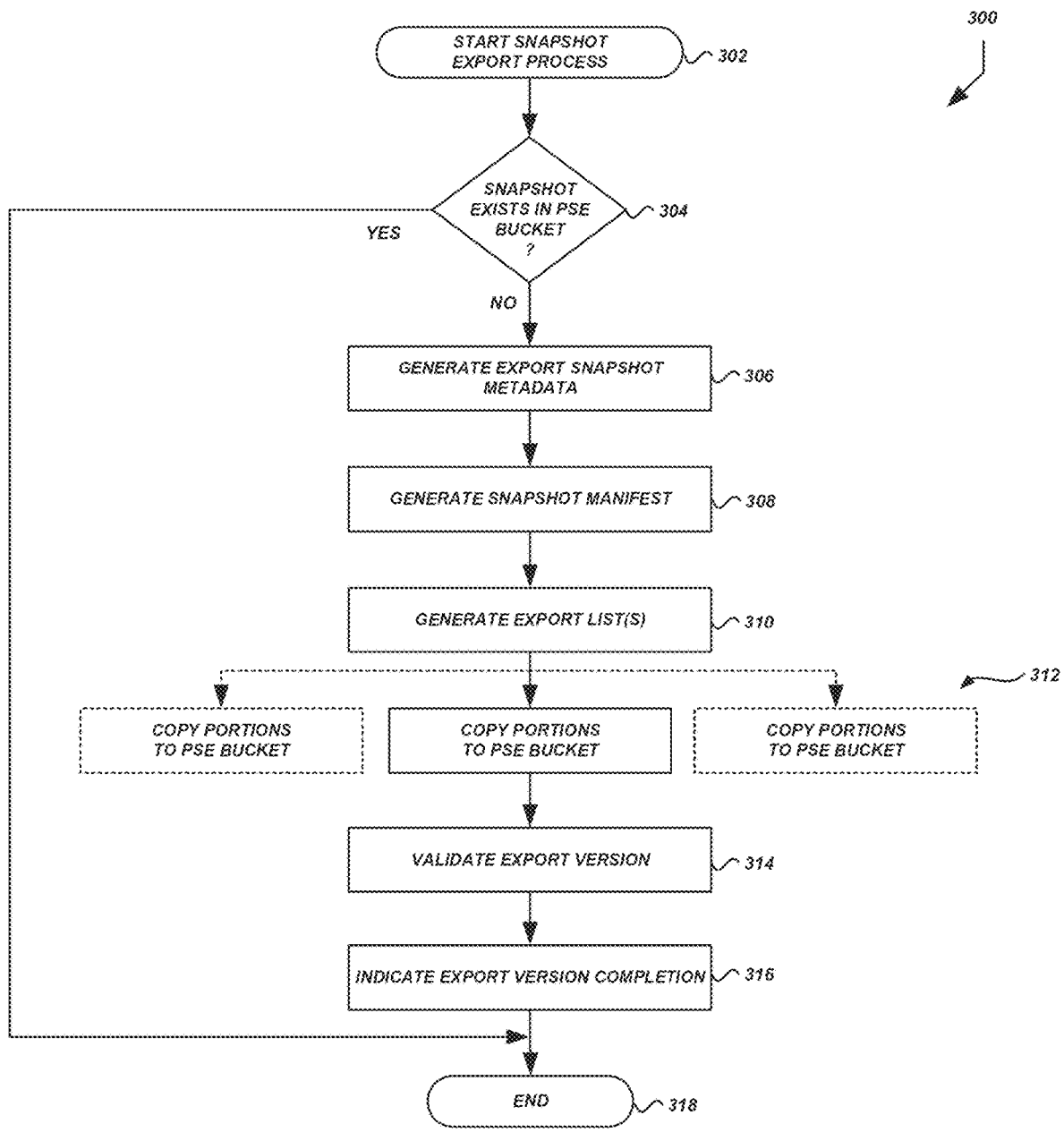
FIG. 3 is a flow diagram of an illustrative process for exporting a snapshot to a provider substrate extension according to some embodiments.

At [7], when the process of generating the export version is complete, the PSE snapshot manager 108 may update the metadata in the snapshot management data store 204 to indicate completion of the export version in the PSE bucket 110. An example process that may be performed by the PSE snapshot manager 108 is shown in FIG. 3 and described in greater detail below.

At [8] the block storage control server 202 may instruct the PSE server 152 in the PSE 150 to create a volume from the export version. At [9], the PSE server 152 may proceed to create the volume from the requested export version. The PSE server 152 may obtain the manifest from the PSE bucket 110 and read the manifest to determine which portions are to be obtained from the PSE bucket 110. The PSE server 152 may then copy the portions of the export version from the PSE bucket 110 to the PSE server 152, decrypt them using the PSE-specific key to which it has access, and use the decrypted data to restore the volume represented by the snapshot.

In some embodiments, the PSE server 152 may obtain the manifest and begin copying the portions of the export version from the PSE bucket 110 to the PSE server 152 prior to when the export version has been completely copied into the PSE bucket 110. For example, once a manifest of portions of the export version has been created, the PSE server 152 may be notified that the manifest is available or otherwise to being copying the export version. The PSE server 152 may access the PSE bucket 110, retrieve the manifest, identify the portions of the export version, and attempt to begin copying the portions. The PSE server 152 may periodically request the portions listed in the manifest. If a requested portion has not yet been copied into the PSE bucket 110, the request may fail. The PSE server 152 may retry the request on a predetermined or dynamically determined schedule (e.g., using a "back off" algorithm) until request is successful and the portion is copied. The PSE server 152 may repeat this process serially or asynchronously until all portions of the export version have been successfully received.

In some embodiments, as shown in FIG. 2, an object gateway 156 can be implemented within the PSE 150 to serve as a gateway for object access (e.g., snapshots, machine images, etc.) using data caching techniques. The object gateway 156 may be implemented in a variety of different ways. For example, an object gateway 156 can be hosted by the resources of the PSE 150 (e.g., a PSE server 152), by another on-premise server, or some other device or system that provides additional resources for a PSE 150. An object gateway 156 can be configured to implement a cache 220, and to cache certain object stores using different caching modes.

The object gateway 156 may provide an API that supports at least some of the operations associated with object stores, such as object GET and PUT operations, that would typically be exercised by devices and components performing data accesses. For example, a VM 166 can attempt to read data from an object store (e.g., with an object GET operation), the read request is redirected to the object gateway 156, and the object gateway fulfills the request locally (if the data is cached) or from the cloud provider network 100 (if the data is not cached). In the case of an object GET operation, the object gateway 156 can fulfill the operation by first checking whether the data is cached and, if not, obtaining it from an object store server 126 in the cloud provider network 100 using an object GET operation. In the case of an object PUT operation, the object gateway 156 can write the data to the cache 220 and to an object store server 126 in the cloud provider network 100 using an object PUT operation.

An object gateway 156 may use a "write-through" data transfer mode for objects written to its cache 220. Using the write-through mode, objects written to the cache 220 may be synchronously written to the associated object store of the cloud provider network 100. Thus, for a write operation of object X, the object gateway 156 will synchronously write object X to the cache 220 and to an object store server 126 in the cloud provider network 100. For a read operation of object X, the object gateway 156 will first check the cache 220 and, if object X is present in the cache 220, the object gateway 156 will fulfill the read operation from the cache 220. Otherwise, the object gateway 156 will fetch the object from an object store server 126, cache the object in the object gateway's cache 220, and send the object to the requesting system.

The object gateway may use a "write-back" data transfer mode for objects written to its cache 220. Under the write-back mode, objects written to the cache are asynchronously written to the associated object store of the cloud provider network 100. Thus, for a write operation of object Z, the object gateway 156 will first write object Z to its cache 220 and, sometime later, write object Z to an object store server 126 of the cloud provider network 100. For a read operation of object Z, the object gateway 156 will first check the cache. If object Z is present in the cache, the object gateway 156 will fulfill the read operation from the cache 220. Otherwise, the object gateway 156 will fetch the object from an object store server 126, cache the object in the object gateway's cache, and send the object to the requesting system.

The caching operations using the object gateway 156 may also be used to obtain snapshots. For example, rather than a PSE server 152 retrieving or otherwise obtaining snapshot portions from the PSE bucket 110 (e.g., as shown at [9] in FIG. 2), the PSE server 152 may request the items from the object gateway 156 (e.g., using a GET operation). The object gateway 156 may provide the requested object if it is present in the cache. If the requested object is not present (e.g., there is a "cache miss"), the object gateway 156 may obtain the requested object from the PSE bucket 110, store it in the cache, and provide it to the PSE server 152.

Turning now to FIG. 3, a process 300 will be described that may be performed by the PSE snapshot manager 108 to manage the creation of an export version of the requested snapshot at the cloud provider network 100. The process beings at block 302. In some embodiments, the process 300 may begin when the PSE snapshot manager 108 receives a request to generate an export version of a requested snapshot, as shown in FIG. 2 at [2].

At decision block 304, the PSE snapshot manager 108 can determine whether an export version of the requested snapshot has already been stored in the PSE bucket 110. In some embodiments, the determination may be based on an identifier of the snapshot. For example, the PSE snapshot manager 108 can inspect metadata associated with the export copies currently in the PSE bucket 110. The metadata may be stored with the export copies, or may be stored separately such as in the snapshot management data store 204. If an export version of the snapshot that corresponds to the identifier of the requested snapshot has already been stored in the PSE bucket 110, the PSE snapshot manager 108 may determine to end the process 300 rather than proceed with generating a duplicate copy. Thus, any latency that would normally be associated with copying requested snapshot to the PSE bucket 110 can be avoided.

In some embodiments, the PSE snapshot manager 108 may use additional data to determine whether an export version of the requested snapshot has already been stored in the PSE bucket 110. For example, the PSE snapshot manager 108 may use a combination of the snapshot identifier and an identifier of the PSE 150 to which the snapshot is to be exported. The identifier of the PSE 150 may be used because the export copies currently in the PSE bucket 110 may have been re-encrypted with PSE-specific encryption keys. Thus, if there is an export version of the requested snapshot present in the PSE bucket 110, but that export version has been encrypted with a PSE-specific encryption key for a different PSE 150, then the PSE 150 to which the snapshot is to be exported may not have access the key and would therefore be unable to use the export version. In this situation, a new export version is to be created using a key to which the PSE 150 has access.

At block 306, the PSE snapshot manager 108 can generate snapshot export metadata indicating the beginning of the export version generation process, as shown at [4] in FIG. 2. The snapshot export metadata may be stored in the snapshot management data store 204. For example, the snapshot management data store 204 may include a table, such as a "snapshot export process table," for information about snapshot export processes. Table 1 below shows example fields that may be included in snapshot export process table. Illustratively, when a new export version is to be created, a new record may be added to the table with a new unique identifier for the export version (in the "exportID" field), the unique identifier for the requested snapshot (in the "sourceSnapshotID" field), and the unique identifier for the PSE 150 to which the export version is to be sent (in the "pseID" field).

TABLE 1

Snapshot Export Process Table exportid—identifier of export version
sourceSnapshotId—identifier of snapshot from which the export version is created
pseID—identifier of the PSE to which the export version is to be exported
manifestCreatedTime—the time that the manifest is created
copyingDataTime—the time import/export worker(s) started copying the snapshot data
snapshotExportedTime—the time import/export worker(s) finished the export version TABLE 1-continued Snapshot Export Process Table exportstate—a string representation of the export's state
deletedTime—the time the export version was deleted
updatedTime—time the record was last updated At block 308, the PSE snapshot manager 108 can generate or otherwise obtain a manifest of the snapshot to be exported, and store the manifest in the PSE bucket 150. The manifest may identify the portions of the export version. In some embodiments, the manifest may be pre-existing and stored in the provider bucket 210, the snapshot management data store 204, or some other data store. The PSE snapshot manager 108 may also update the snapshot export metadata to indicate completion of the manifest. For example, the field "manifestCreatedTime" shown in Table 1 may be set with a timestamp representing the time the manifest was stored in the PSE bucket 150. In this way, other processes that can begin work based on the manifest (e.g., volume partition creation processes) may monitor the snapshot export metadata and begin work, if possible.

At block 310, the PSE snapshot manager 108 can generate one or more export lists for the import/export worker(s) 206 to use in copying the snapshot portions. In the description of the snapshot export process that follows, the import/export workers 206 will be referred to simply as export workers 206 to highlight their export functionality. An export list may indicate which snapshot portions are to be copied from the provider bucket 210 to the PSE bucket 110. The portions may be indicated by a unique identifier or combination of identifiers. In some embodiments, an export list may include additional information, such as the provider-side-only key (or an identifier thereof) to be used to decrypt the portion, the PSE-specific key (or an identifier thereof) to be used to re-encrypt the portion. If multiple export workers 206 are to be used to copy portions of the requested snapshot to the PSE bucket 110, the PSE snapshot manager 108 may generate multiple export lists. Each export worker 206 may be provided with a different export list. Individual export lists may identify subsets of the snapshot portions to be copied, such that each snapshot portion is included in one of the export lists.

At block 312, one or more export workers 206 can copy portions of the requested snapshot into the PSE bucket 110. An individual export worker 206 may access its assigned export list, identify the next portion to be copied, and obtain that portion from the provider bucket 210 as shown in FIG. 2 at [5]. The export worker 206 can then determine whether the portion is to be decrypted and re-encrypted using a PSE-specific key. For example, the export list may indicate whether such a re-encryption process is to be performed, and the key(s) to use. In some embodiments, as described in greater detail below, a snapshot (and therefore the individual portion being copied by an export worker at [5]) may have been stored in the provider bucket 210 encrypted using the PSE-specific key. In this case, there may be no need to perform a decryption and re-encryption operation. Once the export worker 206 has identified the portion and performed any indicated decryption and/or re-encryption process, the export worker 206 can store the snapshot portion in the PSE bucket 110, as shown in FIG. 2 at [6]. The export worker 206 may then repeat the process for each remaining portion indicated in the assigned export list.

The number of export workers 206 may vary from one to any desired number. The export workers 206 may operate and process their export lists in parallel, thus significantly reducing the overall time it may take to copy a snapshot, process it (e.g., re-encrypt it), and store it as a portion of an export version in the PSE bucket 110.

In some embodiments, export workers 206 may generate metadata regarding each portion that is copied. For example, the snapshot management data store 204 may include a table, such as a "copy progress table," in which the progress of the export workers 206 may be recorded. In the copy progress table, the export workers may add a record for each portion that they have copied into the PSE bucket 110. The records may include an identifier of the export (e.g., the value in the "exportID" field of the snapshot export process table shown in Table 1), an identifier of the export worker 206 and or export list being processed, and an identifier of the last portion from the export list that has been copied. After every successful copy of a portion, the export worker 206 may update the identifier of the last portion from the export list that has been copied. By tracking the copy progress in this manner, a replacement export worker 206 may be used if one of the existing export workers 206 fails. In addition, a listing of each portion that has been successfully copied may be made available.

At block 314, the PSE snapshot manager 108 can determine whether the export version has validly been created in the PSE bucket. The validity determination may be based on the snapshot export process table, the copy progress table, inspection of the portions stored in the PSE bucket 110, notifications received from the export workers 206, other data, or some combination thereof. For example, the PSE snapshot manager 108 may receive notifications from each export worker 206 when the export workers 206 finish their respective export lists. The PSE snapshot manager 108 may then access the PSE bucket 110 and check for the presence of all portions of the export version that are listed in the manifest. If all portions are present, the PSE snapshot manager 108 may determine that the export version has validly been created in the PSE bucket 110.

At block 316, the PSE snapshot manager 108 can indicate that the export version of the requested snapshot has been created in the PSE bucket 110. The PSE snapshot manager 108 may send a notification to the block storage control server 202, update the snapshot export process table at [7] in FIG. 2 (e.g., by setting the "snapshotExportedTime" to the current timestamp and/or setting the "exportState" field to indicate completion), or the like. The process 300 may terminate at block 318.

Example Process for Generating an Incremental Snapshot from a PSE

Figure 4:
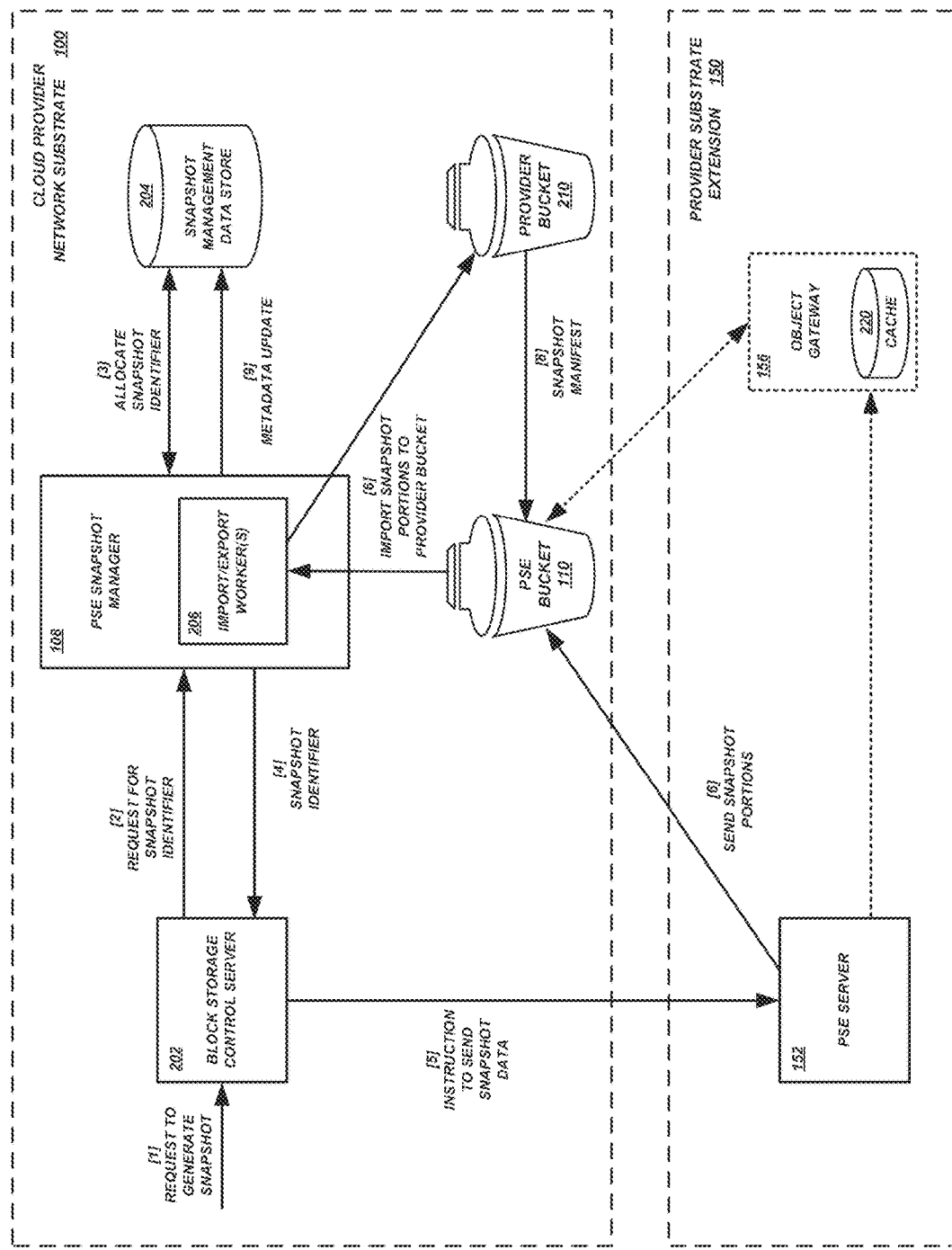
FIG. 4 is a block diagram of illustrative data flows and interactions between components of the cloud provider network and the provider substrate extension during snapshot creation and storage at the cloud provider network according to some embodiments.

FIG. 4 is a block diagram of illustrative data flows and interactions between components of the cloud provider network 100 and PSE 150 during the process of generating a snapshot of a volume or VM of the PSE 150 and storing the snapshot in the object storage service at the cloud provider network 100. Some of the data flows and interactions illustrated in FIG. 4 will be described with further reference to FIG. 5, which is a flow diagram of operations that may be performed or managed by the PSE snapshot manager 108 to process portions received from the PSE 150 and store the requested snapshot in the provider bucket 210.

FIG. 4, like FIG. 2, omits several of the components shown in FIG. 1 for simplicity. In some embodiments, the cloud provider network 100 and PSE 150 may include any or all of the components shown in FIG. 1, additional components, or alternative components.

As shown in FIG. 4 at [1], the block storage control server 202 may receive a request, or otherwise determine that a request has been made, for a new snapshot of volume or VM at the PSE 150 to be created and stored at the cloud provider network 100. The request may include identifiers and/or various other parameters for completing the request. For example, the request may include an identifier of the volume or VM of which the new snapshot is being created, an identifier of the requestor, and an identifier of the PSE server 152 from which the snapshot is to be created. In some embodiments, the request may come from another control plane component 102 of the cloud provider network 100, such as a control server 112 that has been invoked by an API request from the customer responsible for the PSE 150, or invoked automatically based on the occurrence of some condition and/or the application of some policy (e.g., automatic periodic caching according to a schedule or after a threshold amount of data has been modified). In some embodiments, the request may come from the PSE 150 itself, such as a PSE server 152 that makes an API request to the block storage control server 202.

At [2], the block storage control server 202 may send a request to the PSE snapshot manager 108 to allocate an identifier for the new snapshot that is to be created. The PSE snapshot manager 108 may allocate the identifier at [3], and return it to block storage control server 202 at [4]. The allocated identifier may be used in subsequent data flows and interactions to identify individual portions of data as being part of the new snapshot that is being generated. In some embodiments, the PSE snapshot manager 108 may include the allocated identifier in snapshot creation metadata that will be used to track the process of creating the snapshot. For example, a new record may be generated in the snapshot management data store 204.

At [5], the block storage control server 202 can instruct the PSE server 152 to begin sending, to the PSE bucket 110, portions of the volume that are to be included in the new snapshot. The instruction to the PSE server 152 may include the identifier allocated for the new snapshot that is to be created. This identifier may be used to identify the individual portions of the volume as portions to be included in the new snapshot that is being created. Thus, when the PSE snapshot manager 108 later begins the process of copying the individual portions to the provider bucket 210, the portions can be identified as being part of the new snapshot that is being created.

At [6], the PSE server 152 can send, to the PSE bucket 110, volume data to be stored as the new snapshot. In some embodiments, to reduce the amount of data that is sent from the PSE 150 to the cloud provider network 100, the PSE server 152 may send only data representing the portions of the volume that have changed in the time since the volume was restored from an export version of a snapshot that was obtained by the PSE server 152. Such an export version may be referred to as a "basis snapshot" due to its role as the basis from which the volume was created that is currently being backed up as the new snapshot. Because the basis snapshot was received from the PSE bucket 110, the PSE server 152 does not need to send duplicates of the basis snapshot data that has not changed. Rather, the PSE server 152 can identify the individual portions of the volume that include changes, and send only those portions to the PSE bucket 110 to be included with the basis snapshot in a new incremental snapshot. The changed portions may be collectively referred to as change set data, and individual portions may be referred to as change set portions. Sending only the incrementally-changed portions of the volume—the change set portions—to the PSE bucket 110 may significantly reduce the total bandwidth required to generate the incremental snapshot.

Once the PSE server 152 has sent the data to the PSE bucket 110 to be included in the new snapshot, the PSE snapshot manager 108 can begin copying data from the PSE bucket 110 to the provider bucket 210 and complete the snapshot generation process at [7]-[9], as discussed in greater detail below with respect to FIG. 5.

In some embodiments, as shown in FIG. 4, an object gateway 156 can be implemented within the PSE 150 to serve as a gateway for object access (e.g., snapshots, machine images, etc.) using data caching techniques. The caching techniques used by the object gateway 156 may also be used when sending volume portions to the cloud provider network 100 for generating a new snapshot. For example, rather than a PSE server 152 sending or otherwise volume portions to the PSE bucket 110 (e.g., as shown at [6] in FIG. 4), the PSE server 152 may write the volume portions to the object gateway 156 (e.g., using a PUT operation). The object gateway 156 may then provide the volume portions to the PSE bucket 110 serially or asynchronously (e.g., depending upon whether the object gateway 156 is configured to operation in "write-through" mode or "write-back" mode).

Figure 5:
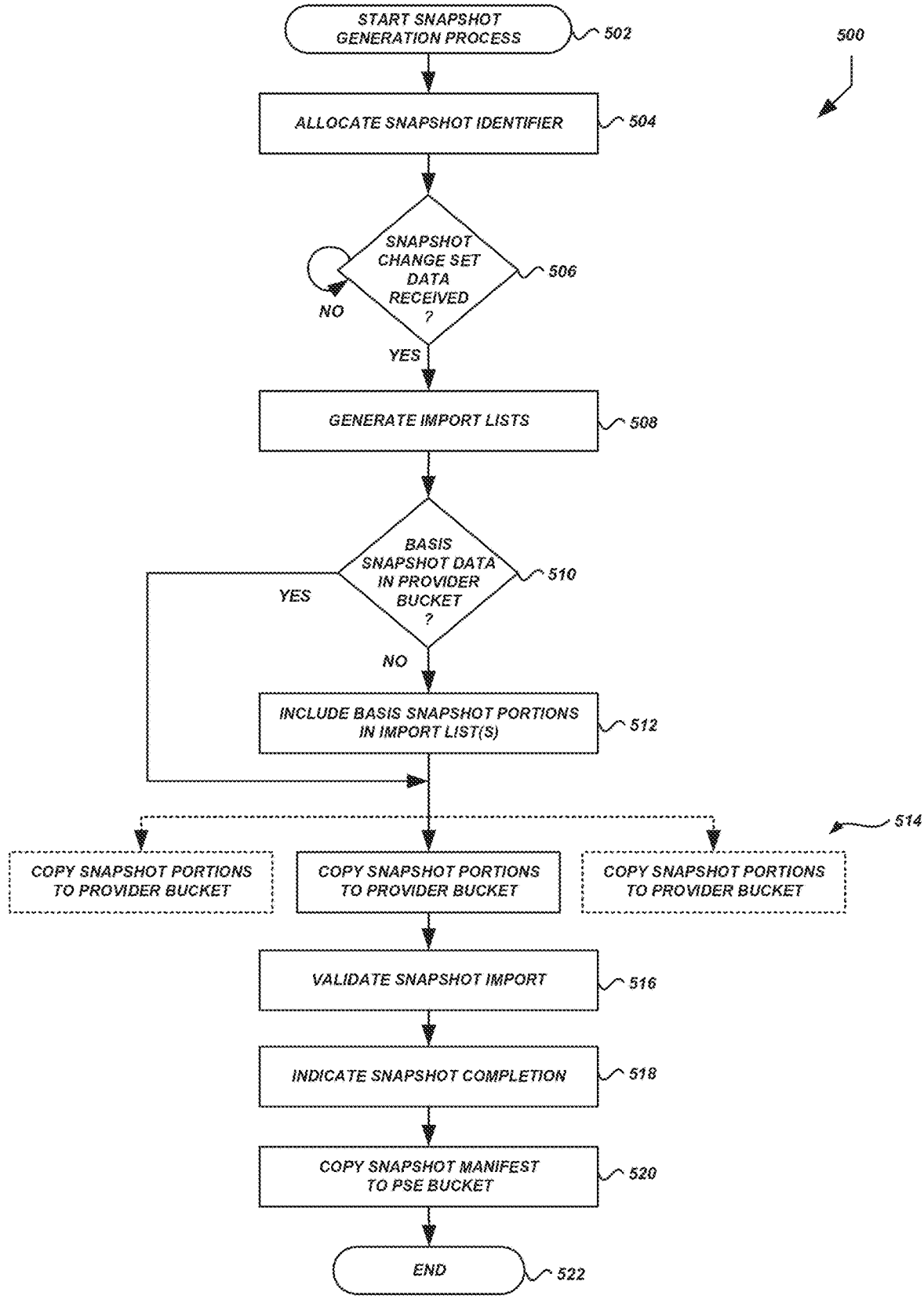
FIG. 5 is a flow diagram of an illustrative process for creating a snapshot from blocks imported from a provider substrate extension according to some embodiments.

Turning now to FIG. 5, a process 500 will be described that may be performed by the PSE snapshot manager 108 to manage the creation of a new snapshot. The process beings at block 502. In some embodiments, the process 500 may begin when the PSE snapshot manager 108 receives a request to allocate an identifier for the new snapshot that is to be created, as shown in FIG. 4 at [2].

At block 504, the PSE snapshot manager 108 can allocate an identifier for the new snapshot. In some embodiments, the PSE snapshot manager 108 may allocate the identifier in the snapshot management data store 204. For example, the PSE snapshot manager 108 may increment the most-recently allocated identifier, generate an identifier using an algorithm, or obtain the identifier using some other method. In addition to allocating the identifier, the PSE snapshot manager 108 may generate a record in a table of the snapshot management data store 204 to store information about the new snapshot, the status of generating the new snapshot, etc. The PSE snapshot manager 108 can return the allocated identifier to the block storage control server 202.

At decision block 506, the PSE snapshot manager 108 can determine whether all of the snapshot change set data from the PSE server 152 has been received. Once the snapshot change set data has been received, the process 500 may proceed to block 508. Determining that all snapshot change set data has been received from the PSE server 152 may be based on notifications or other information generated by the PSE server 152. For example, as the PSE server 152 sends each changed snapshot portion to the PSE bucket 110, the PSE server 152 may send a notification to the block storage control server 202 indicating that the portion has been sent to the PSE bucket 110. When the PSE server 152 has finished sending all of the changed snapshot portions to be sent, it may send another notification to the block storage control server 202 indicating completion of the transmission process. The block storage control server 202 may send the notification(s) (or information derived therefrom) to the PSE snapshot manager 108, or otherwise make the notification(s) available to the PSE snapshot manager 108 (e.g., by publishing them to a notification channel or queue to which the PSE snapshot manager 108 subscribes). The PSE snapshot manager 108 may use the notification(s) to determine that all snapshot change set data from the PSE server 152 has been received.

At block 508, the PSE snapshot manager 108 may generate list of portions to be imported from the PSE bucket 110 to the provider bucket 210. Such a list may be referred to as an import list. The PSE snapshot manager 108 may generate the import list based at least partly on the notifications received from the PSE server 152 regarding the change set portions that the PSE server 152 sent to the PSE bucket 110. At block 510, the PSE snapshot manager 108 may determine whether the basis snapshot, from which the PSE server 152 restored a volume and made changes reflected by the change set portions, is present in the provider bucket 210. If so, the import list may not necessarily include all of the portions that are present in the PSE bucket 110 for the new snapshot, and the new snapshot may be created as an incremental snapshot that includes or references the basis snapshot currently in the provider bucket 210. In this case, the process 500 may proceed to block 514. Otherwise, if the basis snapshot is not already present in the provider bucket 210, the process 500 may proceed to block 512 where the import list includes the portions of the basis snapshot in addition to the change set portions received from the PSE server 152 for the new snapshot.

Illustratively, if the new snapshot to be created is an incremental snapshot reflecting changes that have been made to a volume restored from a basis snapshot, then the basis snapshot may already be present in the provider bucket 210 and the PSE bucket 110. However, the provider bucket 210 may only have a version of the basis snapshot that is encrypted using a provider-side-only key. In this case, even though the basis snapshot is already present in the provider bucket 210, the version of the basis snapshot that is in the PSE bucket 110 encrypted with the PSE-specific key will be added to the import list at block 512. Thus, the incremental portions that have been received from the PSE server 152 do not need to be decrypted using the PSE-specific key and re-encrypted using the provider-side-only key, but are instead grouped with the portions of the basis snapshot that are currently present in the PSE bucket 110 and that have been encrypted with the same PSE-specific key as the incremental portions. In contrast, if at decision block 510 the PSE snapshot manager 108 determines that a basis snapshot that has been encrypted using the same PSE-specific key has already been imported into the provider bucket 210 (e.g., this is a second incremental backup that is based on the same basis snapshot), then only the incremental change set data portions received from the PSE server 152 need to be copied to the provider bucket 210 to have a complete snapshot encrypted using the PSE-specific key. In this case, the PSE snapshot manager 108 adds only the incremental change set portions received from the PSE serer 152 to the import list. If the current snapshot creation process is being performed to generate an original snapshot (e.g., a snapshot that has no basis snapshot for which incremental updates can be saved), then the PSE snapshot manager 108 may add all portions to the import list.

In some embodiments, the PSE snapshot manager 108 may generate multiple import lists, with each import list including a different subset of the portions to be copied to the provider bucket 210. For example, the PSE snapshot manager 108 may use multiple import/export workers 206 to copy snapshot portions from the PSE bucket 110 to the provider bucket 210 in parallel or otherwise asynchronously, similar to the snapshot export process. A different import list may be generated for each import/export worker 206, and each import list may include a subset of all portions that are to be copied to the provider bucket 210. In the description of the import and snapshot creation process that follows, the import/export workers 206 will be referred to simply as import workers 206 to highlight their import functionality.

At block 514, one or more import workers 206 can copy portions of the new snapshot being generated from the PSE bucket 110 into the provider bucket 210. An individual import worker 206 may access its assigned import list, identify the next portion to be imported, and copy that portion from the PSE bucket 110 to the provider bucket 210 as shown in FIG. 4 at [7]. The number of import workers 206 may vary from one to any desired number. The import workers 206 may operate and process their import lists in parallel or asynchronously, thus significantly reducing the overall time it may take to import all portions of the new snapshot from the PSE bucket 110 to the provider bucket 210.

At block 516, the PSE snapshot manager 108 can determine whether all portions of the new snapshot have been validly been copied to the provider bucket 210. The validity determination may be based on inspection of the portions stored in the provider bucket 210, notifications received from the import workers 206, other data, or some combination thereof. For example, the PSE snapshot manager 108 may receive notifications from each import worker 206 when the import workers 206 finish their respective import lists. The PSE snapshot manager 108 may then access the provider bucket 210 and check for the presence of all portions of the snapshot that are listed in the import lists. If all portions are present, the PSE snapshot manager 108 may determine that the snapshot copy has validly been created in the provider bucket 210.

At block 518, the PSE snapshot manager 108 can indicate that the new snapshot has been created in the provider bucket 210. The PSE snapshot manager 108 may send a notification to the block storage control server 202, update snapshot management data store 204 at [9] in FIG. 4 or the like.

At block 520, the PSE snapshot manager 108 may also generate a manifest for the new snapshot or copy an existing manifest to the PSE bucket 110 at [8]. In this way, the new snapshot may be sent back to the PSE 150 at a later time without first copying the portions from the provider bucket 210.

A snapshot manifest may include a listing of all of the portions that make up a particular snapshot, including storage path information for the portions. In some embodiments, storage path information associated with a portion of a snapshot includes a set of one or more identifiers that collectively specify the unique identity and/or storage location of a snapshot portion. For example, the storage path information for a particular snapshot portion may include a first subset of storage path information specifying one or more identifiers such as a bucket identifier, a snapshot family identifier, a snapshot identifier, and the like. The storage path information for the snapshot portion may include a second subset of storage path information specifying an identifier of the snapshot portion itself. The snapshot portion identifier may be the identifier of the file within the storage location specified by the first subset of storage path information. In one illustrative example, a snapshot may include 3 portions, identified as "portion-1," "portion-2," and "portion-3," respectively. The storage path information for the snapshot portions stored in the PSE bucket 110 may include an identifier of the bucket ("PSE-bucket" in this example), an identifier of the snapshot family to which the snapshot belongs ("family-1" in this example), and an identifier of the snapshot to which the snapshot portions belong ("snapshot-1" in this example). The storage path information for the snapshot portions may therefore be "PSE-bucket\\family-1\snapshot-1\portion-1," "PSE-bucket\\family-1\snapshot- 1\portion-2," and "PSE-bucket\\family-1\snapshot-1\portion-3," respectively. In some cases, all portions of a snapshot may not necessarily share the first subset of storage path information. For example, an incremental snapshot may include one or more change set portions and one or more basis snapshot portions. Storage path information for change set portions may include identifiers of the new incremental snapshot (e.g., a snapshot identifier of "snapshot-2") while storage path information for the basis snapshot portions may remain the same (e.g., continue to use the snapshot identifier "snapshot-1") because the portions of the basis snapshot are not duplicated into a different storage location within the same bucket. In such cases, the manifest for the incremental snapshot references the change set portions using their storage path information, and the basis snapshot portions using their original storage path information. Thus, multiple manifests—corresponding to multiple snapshots—may reference one or more of the same basis snapshot portions using the same storage path information.

Advantageously, the storage path information for the snapshot portions in the provider bucket 210 may be identical or substantially identical to the storage path information for the same snapshot portions in the PSE bucket 110. As discussed above, the change set portions are stored in the PSE bucket 110 upon receipt from the PSE server 152, and the basis snapshot is also stored in the PSE bucket 110 as the export version. The snapshot portions are imported into the provider bucket 210 (including the portions of the basis snapshot, if not already present in the provider bucket 210 encrypted using the extension-specific key). During the import process, the snapshot portions are stored such that the storage path information for the snapshot portions is the same as the storage path information for the snapshot portions in the PSE bucket 110 (e.g., the same snapshot family identifier, same snapshot identifier, same portion identifier, etc.). The storage path information for the snapshot portions stored in the provider bucket 210 may include an identifier of the bucket ("provider-bucket" in this example), and the remaining identifiers may be the same as in the PSE bucket 210. The storage path information for the snapshot portions may therefore be "provider-bucket\\family-1\snapshot-1\portion-1," "provider-bucket\\family-1\snapshot-1\portion-2," and "provider-bucket\\family-1\snapshot-1\portion-3," respectively.

When a snapshot is imported into the provider bucket 210 and the import is validated, a manifest for the snapshot may be created to identify the snapshot portions that make up the snapshot in the provider bucket 210. The manifest may include a listing of the portions and their storage path information. In the example above, the manifest would include the storage path information for the three snapshot portions in the provider bucket 210. Because the same snapshot portions remain in the PSE bucket 110 after being imported into the provider bucket 210, a subsequent request to restore a volume from the snapshot to the PSE 150 may be serviced from the PSE bucket 110, without first exporting the duplicate snapshot portions from the provider bucket 210 to the PSE bucket 110. To facilitate this feature, a manifest of the snapshot in the PSE bucket 110 may be stored in the PSE bucket 110. Because the snapshot portions are stored in the PSE bucket 110 using identical or substantially identical storage path information as the snapshot portions in the provider bucket 210, the manifest from the provider bucket 210 may be copied to the PSE bucket 110. In some embodiments, changes to the manifest file may be automatically applied as part of the copy process, such as updating the bucket identifier if such an identifier is included in the storage path information.

The process 500 may terminate at block 522.

Example Process for Sharing Encrypted Snapshots Across Security Boundaries

Figure 6:
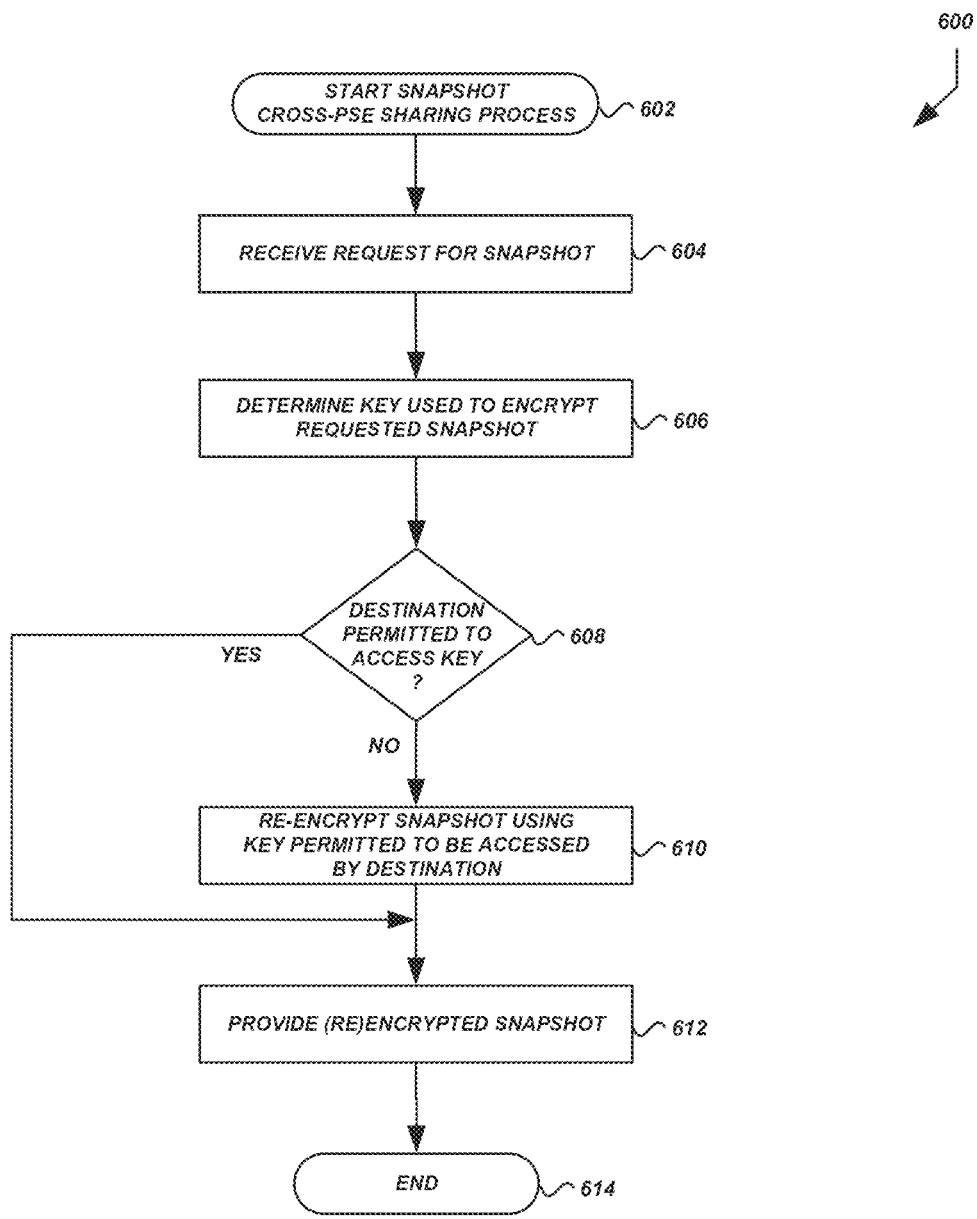
FIG. 6 is a flow diagram of an illustrative process for managing the sharing of encrypted snapshots across security boundaries according to some embodiments.

FIG. 6 illustrates a process 600 that may be performed by the PSE snapshot manager 108 to manage the sharing of encrypted snapshots across security boundaries, including when keys used to encrypt the snapshots are not permitted to be shared across the security boundaries. Portions of the process 600 will be described with respect to the example encrypted snapshot interactions shown in FIGS. 7 and 8 and described in greater detail below.

The process beings at block 602. In some embodiments, the process 600 may be performed as part of the snapshot export process 300 shown in FIG. 3, or vice versa.

At block 604, the PSE snapshot manager 108 can receive a request to export a snapshot. The requested snapshot may be destined for a PSE 150 to be used to restore a volume on a PSE server 152, as a machine image for a PSE server 152, or the like.

At block 606, the PSE snapshot manager 108 can determine the key that was used to encrypt the requested snapshot. In some embodiments, the key that was used to encrypt the requested snapshot may be identified in metadata associated with the snapshot. For example, the snapshot management data store 204 may store data regarding the requested snapshot, including an identifier of the key that was used to encrypt the snapshot (e.g., if the key is stored in a different data store), or the snapshot management data store 204 may store the key itself or data from which the key can be derived.

At decision block 608, the PSE snapshot manager 108 can determine whether the destination of the requested snapshot is permitted to access the key with which the requested snapshot was encrypted or that is otherwise necessary to decrypt and use the snapshot data. If the destination is permitted to access the key, then the process 600 may proceed to block 612. Otherwise, if the destination is not permitted to access the key, then the process 600 may proceed to block 610. Several different example scenarios will be described below for illustrative purposes.

Figure 7:
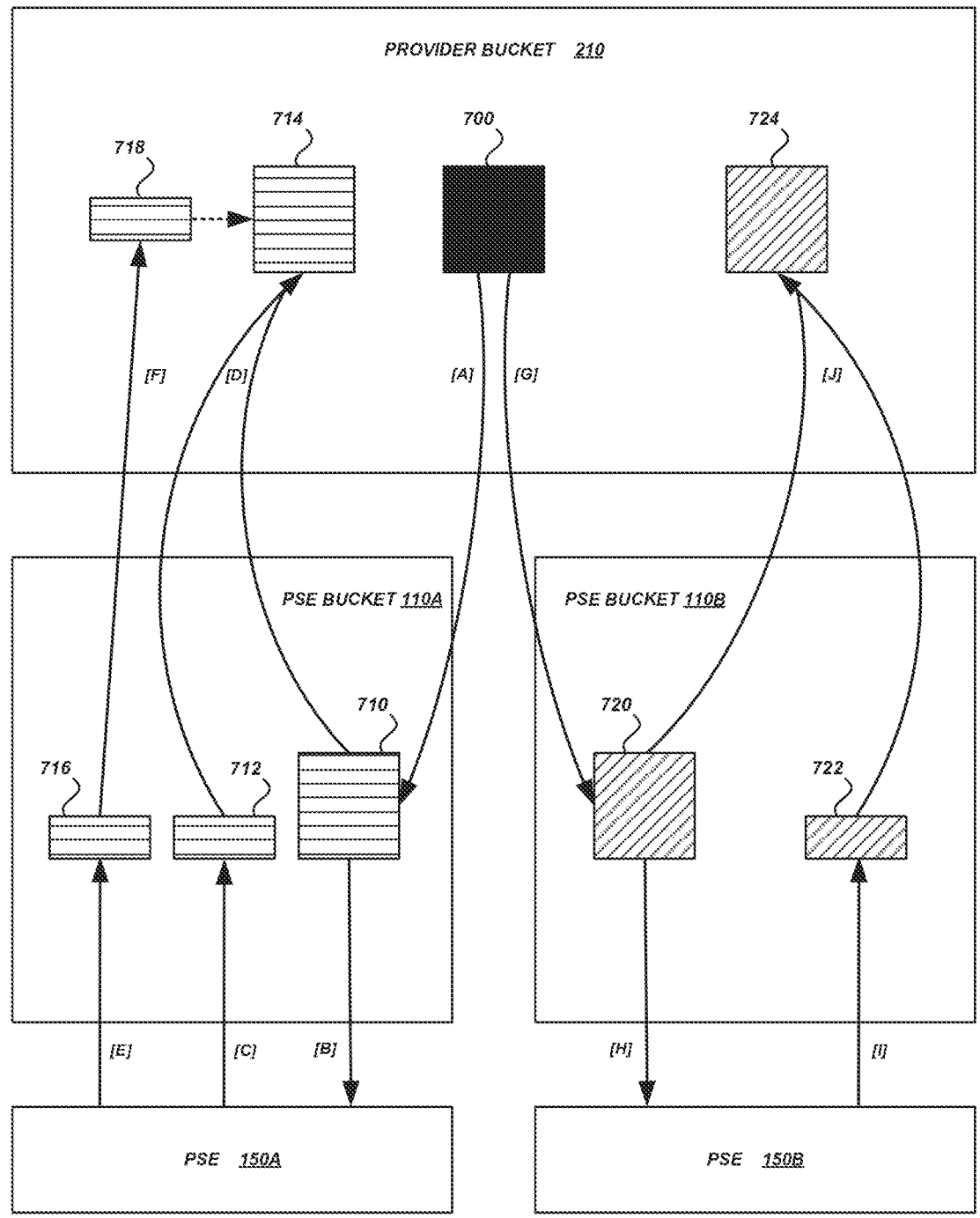
FIG. 7 is a block diagram of illustrative families of snapshots showing various branches corresponding to different encrypted versions of snapshots generated for different provider substrate extensions according to some embodiments.

In a first example, the requested snapshot may be encrypted with a provider-side-only key, and the snapshot may be destined for a server outside of the cloud provider network 100. FIG. 7 shows such a snapshot 700, encrypted with a provider-side-only key and destined for PSE 150A. The provider-side-only key may not be permitted to be accessed outside of the cloud provider network 100. The prohibition may be implemented to reduce the likelihood that the provider-side-only key will be compromised, thus compromising all of the snapshots that have been encrypted with the provider-side-only key and stored in the provider bucket 110. In this example, because the destination of the requested snapshot is a PSE 150A and the requested snapshot has been encrypted using a provider-side-only key, then the PSE snapshot manager 108 may determine that the destination is not permitted to access the key and the process 600 may proceed to block 610.

Figure 8:
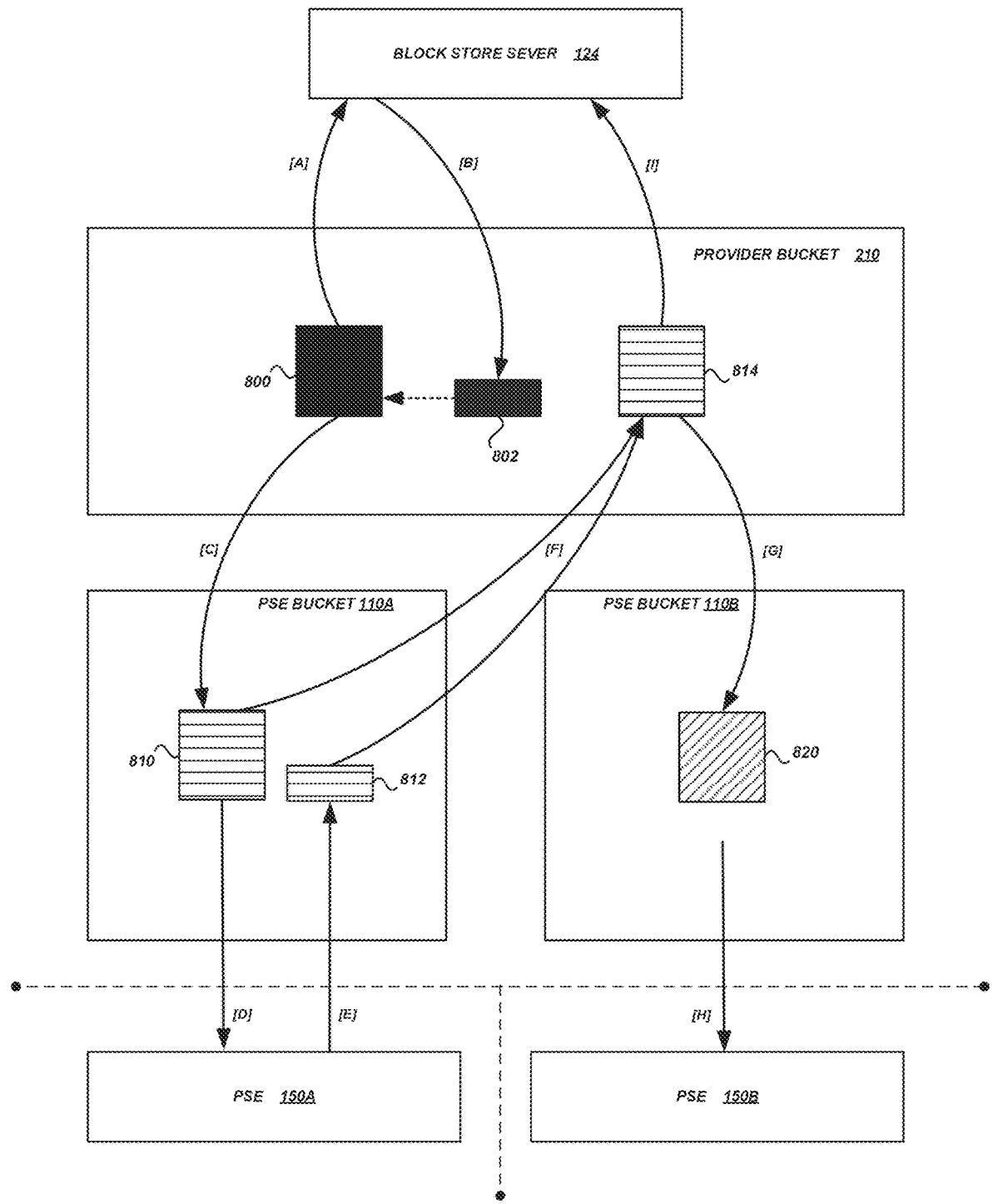
FIG. 8 is a block diagram of illustrative families of snapshots showing various re-encryption of snapshots for different provider substrate extensions according to some embodiments.

In a second example, the requested snapshot may be encrypted with one extension-specific key that is associated with a particular PSE, such snapshot 814 that has been encrypted with an extension-specific key associated with PSE 150A shown in FIG. 8. Illustratively, the snapshot 814 may be an incremental snapshot reflecting changes to a basis snapshot made by PSE 150A. When the incremental snapshot 814 was imported into the provider bucket 110, the encryption applied to the snapshot 814 using the extension-specific key associated with the PSE 150A was retained. Now, the snapshot 814 may be destined for a different PSE, such as PSE 150B shown in FIG. 8. Because PSE 150B is different than PSE 150A from which the snapshot originated, the destination PSE 150B may not be permitted to access the extension-specific key that was used to encrypt the snapshot 814. In this example, the PSE snapshot manager 108 may determine that the destination is not permitted to access the key and the process 600 may proceed to block 610.

In a third example, the requested snapshot may be destined for a server within the provider network 100, such as a block store server 124. FIG. 8 shows snapshot 814, encrypted using an extension-specific key associated with PSE 150A, destined for block store server 124. Because the snapshot 814 is destined for a server within the provider network 100, the destination (block store server 124 in this case) may be permitted to access the necessary key regardless of whether the key is a provider-side-only key or an extension-specific key. In this example, the process 600 may proceed to block 612.

At block 610, the PSE snapshot manager 108 can decrypt the requested snapshot using the necessary key that is not permitted to be accessed by the destination, and then re-encrypt the snapshot using a key that is permitted to be accessed by the destination. Returning to the first example above, the PSE snapshot manager 108 can initiate re-encryption of the snapshot 700 using an extension-specific key that the PSE 150A is permitted to access. Returning to the second example above, the PSE snapshot manager 108 can initiate re-encryption of the snapshot 814 using an extension-specific key that the PSE 150B is permitted to access.

At block 612, the PSE snapshot manager 108 can provide the requested snapshot—re-encrypted if needed as described above—to the destination. The process 600 may terminate at block 614.

With reference to FIG. 7, examples of various versions of snapshots, encrypted using different keys, sent to different PSE buckets, and forming the basis of different incremental snapshot updates will be described.

As shown, a first snapshot 700 may be stored in the provider bucket 110. As described above, the first snapshot 700 may be encrypted with a provider-side-only key. This encryption is illustrated by full shading.

At [A], the first snapshot 700 may be exported to PSE bucket 110A. Illustratively, PSE bucket 110A may be associated with PSE 150A. As part of the export process, the first snapshot 700 may be re-encrypted with an extension-specific key associated with PSE 150A to generate snapshot 710, which is an export copy of snapshot 700. Encryption with the extension-specific key associated with PSE 150A is illustrated with horizontal shading.

At [B], snapshot 710 is provided to the PSE 150A. At [C], PSE 150A can provide a modified portion of the snapshot 710 to the PSE bucket 110A as portion 712. An incremental snapshot including portion 712 may be created at [D]. Because snapshot 710, encrypted with the extension-specific key for PSE 150A has not yet been copied back to the provider bucket 210, the new snapshot 714 may be a full snapshot that includes snapshot 710 and portion 712.

At some later point [E], PSE 150A may provide another modified portion 716, and an incremental snapshot may be created at [F]. In this case, because snapshot 714 has already been copied into the provider bucket 210 and the incremental snapshot to be created is an incremental snapshot of snapshot 714, only the new modified portion 716 may be copied to the provider bucket 210 to create new incremental snapshot 718. This incremental snapshot may reference snapshot 714, which includes the remaining portions of the incremental snapshot 718.

At [G], the first snapshot 700 may be exported to PSE bucket 110B. Illustratively, PSE bucket 110B may be associated with a different PSE: PSE 150B. As part of the export process, the first snapshot 700 may be re-encrypted with an extension-specific key associated with PSE 150B to generate snapshot 720, which is an export copy of snapshot 700. Encryption with the extension-specific key associated with PSE 150B is illustrated with diagonal shading.

At [H], snapshot 720 is provided to the PSE 150B. At [I], PSE 150B can provide a modified portion of the snapshot 720 to the PSE bucket 110B as portion 722. An incremental snapshot including portion 722 may be created at [J]. Because snapshot 720, encrypted with the extension-specific key for PSE 150B has not yet been copied back to the provider bucket 210, the new snapshot 724 may be a full snapshot that includes snapshot 720 and portion 722.

As shown, because the snapshot 700 was provided as an export snapshot to two different PSEs using two different PSE specific encryption keys, a branch has occurred and independent families of snapshots have been created.

With reference now to FIG. 8, examples of various versions of snapshots, encrypted using different keys to account for different security boundaries, will be described.

As shown, a first snapshot 800 may be stored in the provider bucket 110. As described above, the first snapshot 800 may be encrypted with a provider-side-only key. This encryption is illustrated by full shading.

At [A], the first snapshot 800 may be used to restore a volume to a server within the cloud provider network 100, such as block store server 124. Because block store server 124 is within the cloud provider network 100, block store server 124 may be permitted to access the provider-side-only key and therefore no re-encryption procedure may be necessary. At [B], the block store server 124 can initiate creation of an incremental snapshot 802 by providing a modified portion of the snapshot 800 to the provider bucket 110. Because block store server 124 is permitted to access the provider-side-only key, the snapshot 802 may be an incremental snapshot that includes a portion encrypted using the provider-side-only key, and the snapshot 802 may reference the first snapshot 800 for the remaining portions of the snapshot 802.

At [C], the first snapshot 800 may be exported to PSE bucket 110A. Illustratively, PSE bucket 110A may be associated with PSE 150A. The PSE snapshot manager 108 may determine that PSE 150A is not permitted to access the key needed to decrypt the requested snapshot 800 (e.g., the provider-side-only key). Thus, as part of the export process, the first snapshot 800 may be re-encrypted with an extension-specific key associated with PSE 150A to generate snapshot 810, which is an export copy of snapshot 800. Encryption with the extension-specific key associated with PSE 150A is illustrated with horizontal shading.

At [D], snapshot 810 is provided to the PSE 150A. At [E], PSE 150A can provide a modified portion of the snapshot 810 to the PSE bucket 110A as portion 812. A snapshot including portion 812 may be created at [F]. Because snapshot 810, encrypted with the extension-specific key for PSE 150A has not yet been copied back to the provider bucket 210, the new snapshot 814 may be a full snapshot that includes snapshot 810 and portion 812.

At some later point [G], snapshot 814 may be exported to PSE bucket 110B. Illustratively, PSE bucket 110B may be associated with a different PSE: PSE 150B. The snapshot may be destined for a PSE server that is part of PSE 150B. The PSE snapshot manager 108 may determine that PSE 150B is not permitted to access the key needed to decrypt the requested snapshot 814 (e.g., the extension-specific key associated with PSE 150A). Thus, as part of the export process, snapshot 814 may be re-encrypted with an extension-specific key associated with PSE 150B to generate snapshot 820. Encryption with the extension-specific key associated with PSE 150B is illustrated with diagonal shading. At [H], snapshot 820 is provided to the PSE 150B.

At [I], snapshot 814 may also be used to restore a volume to a server within the cloud provider network 100, such as block store server 124. Because block store server 124 is within cloud provider network 100, block store server 124 may be permitted to access the snapshot 814 that has been encrypted using the extension-specific key associated with PSE 150A. For example, an entity that operates the PSE 150A may also use the services of the cloud provider network 100 to restore volumes to block store servers within the cloud provider network 100. Thus, accessing a snapshot that has been encrypted using an extension-specific key for PSE 150A from within the cloud provider network 100 may be permitted.

As shown, the snapshots 800 and 814 are shared across various security boundaries (indicated by dashed lines) to various destinations at various times. Different encryption keys are used to encrypt/re-encrypt the snapshots to facilitate sharing of the snapshots while enforcing the encryption key security boundaries.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes 300, 500, and 600 may begin in response to an event. When the processes 300, 500, and 600 are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the processes 300, 500, and 600—or portions thereof—may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A cloud provider system comprising:
an internal object data store;
an externally-accessible object data store; and
one or more computing devices configured to at least:
store, in the internal object data store, an object storage representation of a data volume,
wherein the object storage representation comprises a first plurality of data objects encrypted using a first extension-specific key,
wherein the first extension-specific key is permitted to be accessed by a first extension of the cloud provider system,
wherein the first extension comprises a first set of computing resources located at a first customer site remote from a region of the cloud provider system and managed by the cloud provider system,
and wherein the first set of computing resources provides, at the first customer site, on-premise computing services corresponding to at least a portion of cloud-based computing services provided by a second set of computing resources within the cloud provider system;
receive a request to restore a block storage representation of the data volume to a second extension of the cloud provider system using the object storage representation, wherein the second extension comprises a third set of computing resources located at a second customer site remote from the region of the cloud provider system and managed by the cloud provider system;
determine that the second extension of the cloud provider system is prohibited from accessing the first extension-specific key;
generate an export version of the object storage representation, wherein the export version comprises a second plurality of data objects encrypted using a second extension-specific key permitted to be accessed by the second extension of the cloud provider system; and
store the export version in the externally-accessible object data store, wherein the second extension of the cloud provider system accesses the export version from the externally-accessible object data store.

2. The cloud provider system of claim 1, wherein the one or more computing devices are further configured to:
receive a second request to restore a second block storage representation of the data volume to a block store server of the cloud provider system;
determine that the block store server is permitted to access data encrypted with the first extension-specific key; and
restore the second block storage representation to the block store server using the first extension-specific key.

3. The cloud provider system of claim 1, wherein the one or more computing devices are further configured to:
receive, in the externally-accessible object data store, a third plurality of data objects from the second extension of the cloud provider system, wherein individual objects of the third plurality of data objects comprise modified versions of individual objects of the second plurality of data objects, and wherein the third plurality of data objects comprises fewer objects than the second plurality of data objects;
generate an incremental update version of the object storage representation comprising the third plurality of data objects and a subset of the second plurality of data objects, wherein the incremental update version is encrypted based on the second extension-specific key, and wherein the third plurality of data objects does not include modified versions of individual objects of the subset of the second plurality of data objects; and store the incremental update version in the internal object data store.

4. A computer-implemented method comprising:

under control of a provider network comprising one or more computing devices configured to execute specific instructions, receiving a request to restore a snapshot of a data volume to a destination extension of the provider network, wherein the destination extension comprises a first set of computing resources located at a customer site remote from a region of the provider network and managed by the provider network, and wherein a first version of the snapshot is stored in an internal data store of the provider network;

determining that the first version of the snapshot is encrypted using a first key permitted to be accessed by a source extension of the provider network, wherein the source extension comprises a second set of computing resources different from the first set of computing resources;

determining that the destination extension is prohibited from accessing the first key; and generating a second version of the snapshot based at least partly on the first version of the snapshot, wherein the second version of the snapshot is encrypted using a second key permitted to be accessed by the destination extension.

5. The computer-implemented method of claim 4, wherein determining that the destination extension is prohibited from accessing the first key is based at least partly on: the first key being associated with the source extension; and the source extension being different than the destination extension.

6. The computer-implemented method of claim 4, further comprising storing the second version of the snapshot in an externally-accessible data store, wherein the destination extension obtains the second version of the snapshot from the externally-accessible data store.

7. The computer-implemented method of claim 4, further comprising:

generating a first export list referencing a first subset of a plurality of portions of the first version of the snapshot;

generating a second export list referencing a second subset of the plurality of portions of the first version of the snapshot;

re-encrypting the first subset of the plurality of portions using the first export list, the first key, and the second key; and re-encrypting the second subset of the plurality of portions using the second export list, the first key, and the second key.

8. The computer-implemented method of claim 7, wherein re-encrypting the first subset of the plurality of portions occurs substantially in parallel with re-encrypting the second subset of the plurality of portions.

9. The computer-implemented method of claim 7, wherein re-encrypting the first subset of the plurality of portions comprises:

decrypting the first subset of the plurality of portions using the first key to generate a decrypted subset of the plurality of portions; and encrypting the decrypted subset of the plurality of portions using the second key.

10. The computer-implemented method of claim 4, further comprising:

receiving a second request to restore the snapshot to a server of the provider network;

determining that the server is permitted to access data encrypted with the first key; and restoring the snapshot to the server using the first key.

11. The computer-implemented method of claim 4, further comprising:

receiving, in an externally-accessible data store, a change set portion from the destination extension, wherein the change set portion comprises a modified version of a portion of the snapshot, and wherein the change set portion is encrypted using the second key;

generating a second snapshot using the change set portion and the second version of the snapshot; and storing the second snapshot in the internal data store.

12. A system comprising:

a substrate network;

an internal data store; and one or more computing devices in communication with the internal data store via the substrate network, wherein the one or more computing devices are configured to at least:

receive a request to restore a data snapshot to a destination network extension comprising a first set of computing resources located at a first customer site remote from a region of the substrate network and managed by the substrate network, wherein a first version of the data snapshot is stored in the internal data store;

determine that the first version of the data snapshot is encrypted using a first key permitted to be accessed by a source network extension comprising a second set of computing resources located at a second customer site remote from the region of the substrate network and managed by the substrate network;

determine that the destination network extension is prohibited from accessing data encrypted using the first key; and generate a second version of the data snapshot based at least partly on the first version of the data snapshot, wherein the second version of the data snapshot is encrypted using a second key permitted to be accessed by the destination network extension.

13. The system of claim 12, wherein the destination network extension is determined to be prohibited from accessing data encrypted using first key based at least partly on: the first key being associated with the source network extension; and the source network extension being different than the destination network extension.

14. The system of claim 12, wherein the one or more computing devices are further configured to store the second version of the data snapshot in an externally-accessible data store, wherein the destination network extension obtains the second version of the data snapshot from the externally-accessible data store.

15. The system of claim 12, wherein the one or more computing devices are further configured to at least:

generate a first export list referencing a first subset of a plurality of portions of the first version of the data snapshot;

generate a second export list referencing a second subset of the plurality of portions of the first version of the data snapshot;

re-encrypt the first subset of the plurality of portions using the first export list, the first key, and the second key; and re-encrypt the second subset of the plurality of portions using the second export list, the first key, and the second key, wherein re-encryption of the first subset of the plurality of portions occurs substantially in parallel with re-encryption of the second subset of the plurality of portions.

16. The system of claim 15, wherein the one or more computing devices configured to re-encrypt the first subset of the plurality of portions are further configured to at least:
    decrypt the first subset of the plurality of portions using the first key to generate a decrypted subset of the plurality of portions; and
    encrypt the decrypted subset of the plurality of portions using the second key.

17. The system of claim 12, wherein the data snapshot comprises one of: a data volume backup, or a machine image.

18. The system of claim 12, wherein the one or more computing devices are further configured to at least:
    receive a second request to restore the data snapshot to a server of the substrate network;
    determine that the server is permitted to access data encrypted with the first key; and
    restore the data snapshot to the server using the first key.

19. The system of claim 12, wherein the one or more computing devices are further configured to at least:
    receive, in an externally-accessible data store, a change set portion from the destination network extension, wherein the change set portion comprises a modified version of a portion of the data snapshot, and wherein the change set portion is encrypted using the second key;
    generate a second data snapshot using the change set portion and the second version of the data snapshot; and
    store the second data snapshot in the internal data store.

20. A computer-implemented method comprising:
    maintaining key data in a region of a cloud provider network, the key data associating a first key with a first extension of the cloud provider network and associating a second key with a second extension of the cloud provider network,
        wherein the first extension is located at a first customer site remote from a region of the cloud provider network and managed by the cloud provider network,
        wherein the first extension comprises a first set of computing resources different from a second set of computing resources of the second extension,
        wherein the second extension is located at a second customer site remote from the region of the cloud provider network and managed by the cloud provider network,
        wherein usage of the first key is limited to the first extension and to an encryption service running within the region of the cloud provider network,
        wherein usage of the second key is limited to the second extension and to the encryption service, and
        wherein the first key is different from the second key;
    receiving a request to use a snapshot of a data volume in the second extension, wherein the snapshot was generated at least partly in the first extension of the cloud provider network;
    determining that a first version of the snapshot is stored in a data store within the region of the cloud provider network and is encrypted using the first key limited to use by the first extension and the encryption service;
    using the encryption service to generate a second version of the snapshot based at least partly on re-encrypting the first version of the snapshot using the second key limited to use by the second extension and the encryption service; and
    transmitting the second version of the snapshot to the second extension.

21. The computer-implemented method of claim 20, further comprising:
    maintaining a first manifest for the first version of the snapshot; and
    maintaining a second manifest for the second version of the snapshot;
    wherein the first and second manifests comprise substantially identical storage path information for corresponding portions of the snapshot.

22. The cloud provider system of claim 1, further comprising a plurality of availability zones,
    wherein a first availability zone of the plurality of availability zones comprises a first subset of cloud provider resources,
    wherein a second availability zone of the plurality of availability zones comprises a second subset of cloud provider resources,
    wherein the first availability zone is in communication with the second availability zone over a private network, and
    wherein the first availability zone is in communication with the first extension of the cloud provider system over a public network.

* * * * *

UNITED STATES PATENT AND TRADEMARK OFFICE
CERTIFICATE OF CORRECTION

| | |
|---|---|
| PATENT NO. | : 11,662,928 B1 |
| APPLICATION NO. | : 16/698314 |
| DATED | : May 30, 2023 |
| INVENTOR(S) | : Sandeep Kumar |

It is certified that error appears in the above-identified patent and that said Letters Patent is hereby corrected as shown below:

In the Specification

Column 3, Line 55, delete "ta" and insert -- a --.

Column 18, Line 59, delete "exportid" and insert -- exportId --.

Column 19, Line 4, delete "exportstate" and insert -- exportState --.

Column 20, Line 15, delete "and or" and insert -- and/or --.

Column 21, Line 61, delete "anew" and insert -- a new --.

Column 23, Line 48, delete "serer" and insert -- server --.

Signed and Sealed this
Twenty-ninth Day of August, 2023

Katherine Kelly Vidal
*Director of the United States Patent and Trademark Office*